United States Patent
Holland et al.

(10) Patent No.: US 12,294,664 B2
(45) Date of Patent: May 6, 2025

(54) PHYSICAL UNCLONABLE FUNCTION CONFIGURATION AND READOUT

(71) Applicant: Analog Devices International Unlimited Company, Limerick (IE)

(72) Inventors: William Michael James Holland, Edinburgh (GB); George Redfield Spalding, Jr., Edinburgh (GB); Jonathan Ephraim David Hurwitz, Edinburgh (GB)

(73) Assignee: Analog Devices International Unlimited Company, Limerick (IE)

( * ) Notice: Subject to any disclaimer, the term of this patent is extended or adjusted under 35 U.S.C. 154(b) by 211 days.

(21) Appl. No.: 17/829,654

(22) Filed: Jun. 1, 2022

(65) Prior Publication Data

US 2022/0368544 A1 Nov. 17, 2022

Related U.S. Application Data

(63) Continuation of application No. 16/986,210, filed on Aug. 5, 2020, now Pat. No. 11,394,566.

(51) Int. Cl.
G06F 21/00 (2013.01)
G06F 17/18 (2006.01)
H04L 9/32 (2006.01)

(52) U.S. Cl.
CPC ............ *H04L 9/3278* (2013.01); *G06F 17/18* (2013.01); *H04L 9/3255* (2013.01)

(58) Field of Classification Search
USPC .......................................................... 726/20
See application file for complete search history.

(56) References Cited

U.S. PATENT DOCUMENTS

| 8,415,969 B1 | 4/2013 | Ficke et al. |
| 8,525,549 B1 | 9/2013 | Feng et al. |

(Continued)

FOREIGN PATENT DOCUMENTS

| CN | 104852727 A | 8/2015 |
| CN | 108734030 A | 11/2018 |

(Continued)

OTHER PUBLICATIONS

International Search Report and Written Opinion for International Application No. PCT/EP2021/070742 mailed Oct. 18, 2021.

(Continued)

*Primary Examiner* — Maung T Lwin
(74) *Attorney, Agent, or Firm* — Knobbe, Martens, Olson & Bear, LLP

(57) ABSTRACT

The present disclosure relates to configuring at least one pair of devices in a physical unclonable function (PUF) apparatus and reading out at least one pair of devices for determining a persistent random PUF output. The pair of devices may be readout by measuring a physical difference between the devices/components caused by random manufacturing differences, which may then be used to determine a persistence random PUF output. Configuring the pair of devices includes measuring the random manufacturing difference and, based on that measurement, setting a readout condition for the pair of devices, which dictates aspects of the readout process that should be used for that pair of devices. Each time the pair of devices is readout in the future, it may be readout in accordance with the condition that was set at configuration.

17 Claims, 13 Drawing Sheets

(56) References Cited

U.S. PATENT DOCUMENTS

| | | | |
|---|---|---|---|
| 8,619,979 B2 | 12/2013 | Ficke et al. | |
| 8,971,527 B2* | 3/2015 | BrightSky | H04L 9/0816 |
| | | | 380/278 |
| 9,018,972 B1 | 4/2015 | Gurrieri et al. | |
| 9,584,329 B1* | 2/2017 | Trimberger | H04L 9/3278 |
| 9,966,954 B1 | 5/2018 | Yang et al. | |
| 9,985,791 B2 | 5/2018 | Cambou | |
| 10,216,965 B2 | 2/2019 | Plusquellic et al. | |
| 10,243,749 B2 | 3/2019 | Park et al. | |
| 10,361,700 B1* | 7/2019 | Lu | G11C 11/412 |
| 10,560,095 B2 | 2/2020 | O'Dwyer et al. | |
| 10,764,069 B1 | 9/2020 | Hurwitz | |
| 11,102,016 B2 | 8/2021 | Hurwitz | |
| 11,190,365 B2 | 11/2021 | Lu | |
| 11,240,047 B2 | 2/2022 | Hurwitz | |
| 11,394,566 B2 | 7/2022 | Holland et al. | |
| 2004/0046605 A1 | 3/2004 | Granville | |
| 2009/0083833 A1 | 3/2009 | Ziola et al. | |
| 2009/0194598 A1 | 8/2009 | Kim et al. | |
| 2010/0031065 A1 | 2/2010 | Futa et al. | |
| 2011/0317829 A1 | 12/2011 | Ficke et al. | |
| 2012/0020145 A1 | 1/2012 | Huber et al. | |
| 2013/0254636 A1 | 9/2013 | Kirkpatrick et al. | |
| 2013/0322617 A1 | 12/2013 | Orshansky | |
| 2014/0279532 A1 | 9/2014 | Tremlet | |
| 2015/0046718 A1* | 2/2015 | Meyer | H04L 9/3278 |
| | | | 713/189 |
| 2015/0058928 A1 | 2/2015 | Guo et al. | |
| 2015/0262653 A1 | 9/2015 | Chu et al. | |
| 2015/0278551 A1 | 10/2015 | Lyer et al. | |
| 2016/0110130 A1* | 4/2016 | Kan | G11C 16/0408 |
| | | | 711/163 |
| 2016/0182045 A1 | 6/2016 | Mai et al. | |
| 2016/0269186 A1 | 9/2016 | Wallrabenstein | |
| 2017/0017808 A1 | 1/2017 | Kwong et al. | |
| 2017/0149572 A1 | 5/2017 | Wallrabenstein | |
| 2017/0345116 A1 | 11/2017 | Katoh | |
| 2017/0346644 A1 | 11/2017 | Cambou | |
| 2018/0013431 A1 | 1/2018 | Bury et al. | |
| 2018/0019881 A1 | 1/2018 | Pfeiffer et al. | |
| 2018/0091300 A1 | 3/2018 | Tomishima | |
| 2018/0176025 A1 | 6/2018 | Suresh et al. | |
| 2018/0337791 A1 | 11/2018 | Ammo et al. | |
| 2019/0028274 A1 | 1/2019 | Choi et al. | |
| 2019/0068383 A1 | 2/2019 | Wang | |
| 2019/0132137 A1* | 5/2019 | Zhong | H04L 9/3278 |
| 2019/0158299 A1* | 5/2019 | Poo | H04L 9/0861 |
| 2019/0221139 A1* | 7/2019 | Schrijen | H04L 9/0866 |
| 2019/0342105 A1 | 11/2019 | Adams et al. | |
| 2020/0044871 A1 | 2/2020 | Lu | |
| 2020/0136840 A1* | 4/2020 | Lee | G06F 21/73 |
| 2020/0150929 A1* | 5/2020 | Cambou | H04L 9/3278 |
| 2020/0169423 A1* | 5/2020 | Cambou | H04L 9/0866 |
| 2020/0210628 A1* | 7/2020 | Karpinskyy | G06F 21/75 |
| 2020/0213138 A1 | 7/2020 | Mondello et al. | |
| 2020/0235735 A1 | 7/2020 | Plusquellic et al. | |
| 2020/0287729 A1 | 9/2020 | Hurwitz | |
| 2020/0313003 A1 | 10/2020 | Shen et al. | |
| 2020/0356085 A1* | 11/2020 | Wentz | H04L 9/0866 |
| 2021/0019118 A1 | 1/2021 | Fu et al. | |
| 2021/0091952 A1 | 3/2021 | Wentz | |
| 2021/0184870 A1 | 6/2021 | Hurwitz | |
| 2021/0250187 A1* | 8/2021 | Lu | H01L 27/0922 |
| 2021/0342489 A1 | 11/2021 | Kumar et al. | |
| 2022/0029835 A1 | 1/2022 | Fourquin et al. | |
| 2022/0043937 A1 | 2/2022 | Spalding et al. | |
| 2022/0045872 A1 | 2/2022 | Holland et al. | |
| 2022/0209970 A1 | 6/2022 | Hurwitz | |

FOREIGN PATENT DOCUMENTS

| | | |
|---|---|---|
| EP | 1 154 380 A1 | 11/2001 |
| EP | 3 270 539 A1 | 1/2018 |
| EP | 3 668 003 A1 | 6/2020 |
| JP | 2017-092885 A | 5/2017 |
| KR | 101359783 B1 | 2/2014 |
| KR | 101408619 B1 | 6/2014 |
| WO | WO 2019/212849 A1 | 11/2019 |
| WO | WO 2022/028928 A1 | 2/2022 |
| WO | WO 2022/058567 A1 | 3/2022 |

OTHER PUBLICATIONS

International Search Report and Written Opinion for International Application No. PCT/EP2021/070743 mailed Dec. 21, 2021.

Kalyanaraman et al., Highly Secure Strong PUF based on Nonlinearity of MOSFET Subthreshold Operation. Thesis. Department of Electrical and Computer Engineering. The University of Texas at Austin. 2012; 13 pages.

Tang et al., A Physical Unclonable Function based on Capacitor Mismatch in a Charge-Redistribution SAR-ADC. 2018 IEEE International Symposium on Circuits and Systems. ISCAS 2018—Proceedings. May 2018; 5 pages.

European Examination Report Issued for Application 21749170.3 dated Jan. 20, 2025 in 4 pages.

* cited by examiner

PHYSICAL UNCLONABLE FUNCTION CONFIGURATION AND READOUT

CROSS-REFERENCE TO RELATED APPLICATIONS

The present application is a continuation claiming the benefit of U.S. application Ser. No. 16/986,210, filed Aug. 5, 2020 and entitled "PHYSICAL UNCLONABLE FUNCTION CONFIGURATION AND READOUT", which is hereby incorporated by reference herein in its entirety.

TECHNICAL FIELD

The present disclosure relates to methods and apparatus for configuring and reading out a physical unclonable function.

BACKGROUND

A physical unclonable function (sometimes also called physically unclonable function) or 'PUF' is a physical entity capable of generating an output ('response') to a given input ('challenge') that is unique to that particular PUF such that it can be regarded as a 'fingerprint'. This capacity is typically arrived at by devising the PUF in such a way that its output depends upon features that differ randomly in each device due to minor manufacturing variations. Thus, a PUF cannot be readily replicated with the correct fingerprint, even with full knowledge of its circuit layout. The response may be used for various different purposes, for example in cryptographic operations to secure communications to/from a device that includes the PUF, or used in a process of authenticating the identity of a device that includes the PUF, etc.

A PUF apparatus may comprise one or more pairs of physical devices, each comprising some physical features that differ randomly due to minor manufacturing variations, and some determination circuitry configured to readout a PUF value from pair of physical devices. The PUF apparatus may be configured such that the determination circuitry can read out a persistent random PUF value from each of the pairs of physical devices and generate a persistent random number based on the PUF value(s). The persistent random number may then be used as part of the determination of a 'response' to a 'challenge'. For example, the PUF apparatus may receive a 'challenge' from another circuit, the determination circuitry may then read the persistent random number from the PUF cells and the PUF apparatus may then determine a 'response' based on the 'challenge' and the persistent random number (for example, by carrying out some cryptographic operation, such as a hash, or XOR, or encryption using the 'challenge' and the persistent random number). A persistent random number is random in that its value is dependent on the minor, random manufacturing variations between different PUF apparatus. Thus, different instances of the PUF apparatus, whilst identical in design, should each generate a different, persistent random number. A random number is 'persistent' in that it should stay the same, or stay the same within acceptable limits, over time. For example, the persistent random number generated by the one or more PUF cells of a PUF apparatus should be the same each time it is generated (or stay the same within acceptable limits, for example so that it can be corrected using error correcting code, ECC), so that it can act as a reliable fingerprint of the device.

SUMMARY

The present disclosure relates to configuring at least one pair of devices in a physical unclonable function (PUF) apparatus and reading out at least one pair of devices for determining a persistent random PUF output. The pair of devices may be readout by measuring a physical difference between the devices/components caused by random manufacturing differences, which may then be used to determine a persistence random PUF output. Configuring the pair of devices includes measuring the random manufacturing difference and, based on that measurement, setting a readout condition for the pair of devices, which dictates aspects of the readout process that should be used for that pair of devices. Each time the pair of devices is readout in the future, it may be readout in accordance with the condition that was set at configuration.

In a first aspect of the disclosure, there is provided a method of configuring a pair of devices in a Physical Unclonable Function, PUF, system, wherein the pair of devices is for use in generating a persistent random value, the method comprising: measuring a physical characteristic of the pair of devices, wherein the measurement of the physical characteristic is indicative of a random manufacturing variation between the pair of devices; comparing the measurement of the physical characteristic against one or more configuration thresholds; and setting, based on the comparison, a configuration indicator associated with the pair of devices to assign the pair of devices to either: a first readout condition; or a second readout condition; wherein the first read-out condition indicates that when generating the persistent random value using the pair of devices during PUF readout, the physical characteristic of the pair of devices should be compared against at least one first readout condition threshold.

The first readout threshold may be different to the at least one configuration threshold.

The method may further comprise: setting a value of the one or more configuration thresholds relative to a value of the first readout condition threshold such that the one or more configuration thresholds define a readout error margin for the first readout condition threshold, wherein assigning the configuration indicator further comprises: assigning the configuration indicator to the first readout condition when the comparison of the measurement of physical characteristic against the one or more configuration thresholds indicates that the measurement of physical characteristic is outside of the readout error margin; and assigning the configuration indicator to the second readout condition when the comparison of the measurement of physical characteristic against the one or more configuration thresholds indicates that the measurement of physical characteristic is within the readout error margin.

The second readout condition may indicate that the pair of devices should not be used for generating a persistent random value. Alternatively, the second readout condition may indicate that when generating the persistent random number during PUF readout, the physical characteristic of the pair of devices should be compared against at least one second readout condition threshold.

The configuration indicator may comprise a 1-bit number, the value of which indicates if the pair of devices is assigned to the first readout condition or the second readout condition.

The at least one first readout condition threshold may be set such that there is a substantially equal likelihood of each possible persistent random value.

The method may further comprise setting the at least one first readout condition threshold based on a statistical analysis of measurements of the physical characteristic of a plurality of pairs of devices in the PUF system.

The method may further comprise in parallel with measuring the physical characteristic of the pair of devices, measuring a physical characteristic of one or more further pairs of device; comparing the measurement of the physical characteristic of the one or more further pairs of devices against the one or more configuration thresholds; and setting, based on the comparison, one or more configuration indicators associated with the one or more further pairs of devices to assign each of the one or more further pair of devices to either: the first readout condition; or the second readout condition.

In a second aspect of the disclosure, there is provided a Physical Unclonable Function, PUF, system comprising: a pair of devices for use in generating a persistent random value; and a determination unit for configuring the pair of device, the determination unit being configured to: measure a physical characteristic of the pair of devices, wherein the measurement of the physical characteristic is indicative of a random manufacturing variation between the pair of devices; compare the measurement of the physical characteristic against one or more configuration thresholds; and set, based on the comparison, a configuration indicator associated with the pair of devices to assign the pair of devices to either: a first readout condition; or a second readout condition; wherein the first read-out condition indicates that when generating the persistent random value using the pair of devices during PUF readout, the physical characteristic of the pair of devices should be compared against at least one first readout condition threshold.

In a third aspect of the present disclosure, there is provided a method of reading out a Physical Unclonable Function, PUF, system that comprises a pair of devices, the method comprising: reading a configuration indicator associated with the pair of devices to determine if the pair of devices was assigned during configuration to a first read-out condition or to a second readout condition; and if the configuration indicator is indicative of the pair of devices being assigned to the first readout condition: determining a persistent random value using the pair of devices by comparing a physical characteristic of the pair of devices against at least one first readout condition threshold, wherein the physical characteristic is indicative of a random manufacturing variation between the pair of devices; otherwise if the configuration indicator is indicative of the pair of devices being assigned to the second readout condition: performing a second readout condition action.

Determining the persistent random value may further comprise measuring the physical characteristic of the pair of devices.

Measuring the physical characteristic of the pair of devices may comprise determining a digital measurement of the physical characteristic of the pair of devices to M quantisation levels, wherein the persistent random value is a digital value to N quantisation levels, and wherein M is greater than N.

The at least one first read-out condition threshold may defines a first plurality of ranges, wherein if the configuration indicator is indicative of the pair of devices being assigned to the first readout condition, determining the persistent random value using the pair of devices may comprise determining which of the first plurality of ranges the physical characteristic of the pair of devices is within.

The second readout condition may indicate that the pair of devices should not be used for generating a persistent random value, and wherein the second read-out condition action may comprise not determining a persistent random value using the pair of devices.

Wherein the second read-out condition action may comprise: determining a persistent random value using the pair of devices by comparing a physical characteristic of the pair of devices against at least one second read-out condition threshold that is different from the at least one first read-out condition threshold.

The at least one second read-out condition threshold may define a second plurality of ranges, each associated with a particular persistent random value, wherein if the configuration indicator is indicative of the pair of devices being assigned to the second readout condition, determining the persistent random value using the pair of devices comprises determining which of the second plurality of ranges the physical characteristic of the pair of devices is within.

The persistent random value may be a 1-bit value, or may be a multi-bit word.

The PUF system may further comprise one or more further pairs of devices, and the method may further comprise: reading a configuration indicator associated with each of the one or more further pairs of devices to determine if each of the one or more further pairs of devices was assigned during configuration to the first read-out condition or to the second readout condition; and for each of the one or more further pairs of devices if the configuration indicator is indicative of the further pair of devices being assigned to the first readout condition: in parallel with determining the persistent random value, determining a further persistent random value using the further pair of devices by comparing a physical characteristic of the further pair of devices against the at least one first readout condition threshold; otherwise if the configuration indicator is indicative of the further pair of devices being assigned to the second readout condition: performing a second readout condition action. The method may further comprise determining a PUF output based at least in part on the persistent random value and the one or more further persistent random values.

In a fourth aspect of the present disclosure, there is provided a Physical Unclonable Function, PUF, system comprising: a pair of devices for use in generating a persistent random value; and a determination unit configured to: read a configuration indicator associated with the pair of devices to determine if the pair of devices was assigned during configuration to a first read-out condition or to a second readout condition; and if the configuration indicator is indicative of the pair of devices being assigned to the first readout condition: determine a persistent random value using the pair of devices by comparing a physical characteristic of the pair of devices against at least one first readout condition threshold, wherein the physical characteristic is indicative of a random manufacturing variation between the pair of devices; otherwise if the configuration indicator is indicative of the pair of devices being assigned to the second readout condition: perform a second readout condition action.

The determination unit may be configured to determine the persistent random value at least in part by measuring the physical characteristic of the pair of devices.

The at least one first read-out condition threshold may define a first plurality of ranges, wherein if the configuration indicator is indicative of the pair of devices being assigned to the first readout condition, determining the persistent random value using the pair of devices may comprise determining which of the first plurality of ranges the physical characteristic of the pair of devices is within.

The second readout condition may indicate that the pair of devices should not be used for generating a persistent random value, wherein the second read-out condition action may comprise not determining a persistent random value using the pair of devices.

The second read-out condition action may comprise: determining a persistent random value using the pair of devices by comparing a physical characteristic of the pair of devices against at least one second read-out condition threshold that is different from the at least one first read-out condition threshold.

The at least one second read-out condition threshold may define a second plurality of ranges, each associated with a particular persistent random value, wherein if the configuration indicator is indicative of the pair of devices being assigned to the second readout condition, determining the persistent random value using the pair of devices may comprise determining which of the second plurality of ranges the physical characteristic of the pair of devices is within.

The at least one second read-out condition threshold defines a second plurality of ranges, each associated with a particular persistent random value, and wherein if the configuration indicator is indicative of the pair of devices being assigned to the second readout condition, determining the persistent random value using the pair of devices comprises determining which of the second plurality of ranges the physical characteristic of the pair of devices is within.

The PUF system may further comprise one or more further pairs of devices, the determination unit being further configured to: read a configuration indicator associated with each of the one or more further pairs of devices to determine if each of the one or more further pairs of devices was assigned during configuration to the first read-out condition or to the second readout condition; and for each of the one or more further pairs of devices; if the configuration indicator is indicative of the further pair of devices being assigned to the first readout condition: in parallel with determining the persistent random value, determine a further persistent random value using the further pair of devices by comparing a physical characteristic of the further pair of devices against the at least one first readout condition threshold; otherwise if the configuration indicator is indicative of the further pair of devices being assigned to the second readout condition: perform a second readout condition action.

In a fifth aspect of the present disclosure, there is provided a PUF apparatus comprising: a pair of devices; and a determination unit configured to determine a persistent random value using the pair of devices by: reading a configuration indicator associated with the pair of devices to determine if the pair of devices was assigned during configuration to a first read-out condition or to a second readout condition; and if the configuration indicator is indicative of the pair of devices being assigned to the first readout condition: determining the persistent random value using the pair of devices by comparing a physical characteristic of the pair of devices against at least one first readout condition threshold, wherein the physical characteristic is indicative of a random manufacturing variation between the pair of devices.

In a sixth aspect of the present disclosure, there is provided a PUF apparatus for generating a PUF output that is a persistent random number, the PUF apparatus comprising: a plurality of PUF cells, each comprising a pair of electronic devices; and a PUF output unit configured to: determine a measurement of a physical characteristic of at least one of the plurality of PUF cells; and determine the PUF output based at least in part on a magnitude of each of the determined measurements. Optionally, the PUF apparatus may be configured to measure, in parallel, the physical characteristic of two or more of the plurality of PUF cells and then determine a PUF output based at least in part on the magnitude of the two or more determined measurements. Using this technique, faster readout may be achieved, whilst still maintaining the persistence to the PUF output.

In a seventh aspect of the present disclosure, there is provided a method for generating a PUF output that is a persistent random number, the method comprising: determining a measurement of a physical characteristic of at least one of a plurality of PUF cells that each comprise a pair of electronic devices; and determining the PUF output based at least in part on a magnitude of each of the determined measurements. Optionally, the physical characteristic of two or more of the plurality of PUF cells may be measured in parallel and the PUF output determined based at least in part on the magnitude of the two or more determined measurements.

DRAWINGS

Aspects of the present disclosure are described, by way of example only, with reference to the following drawings, in which.

DETAILED DESCRIPTION

Figure 1:
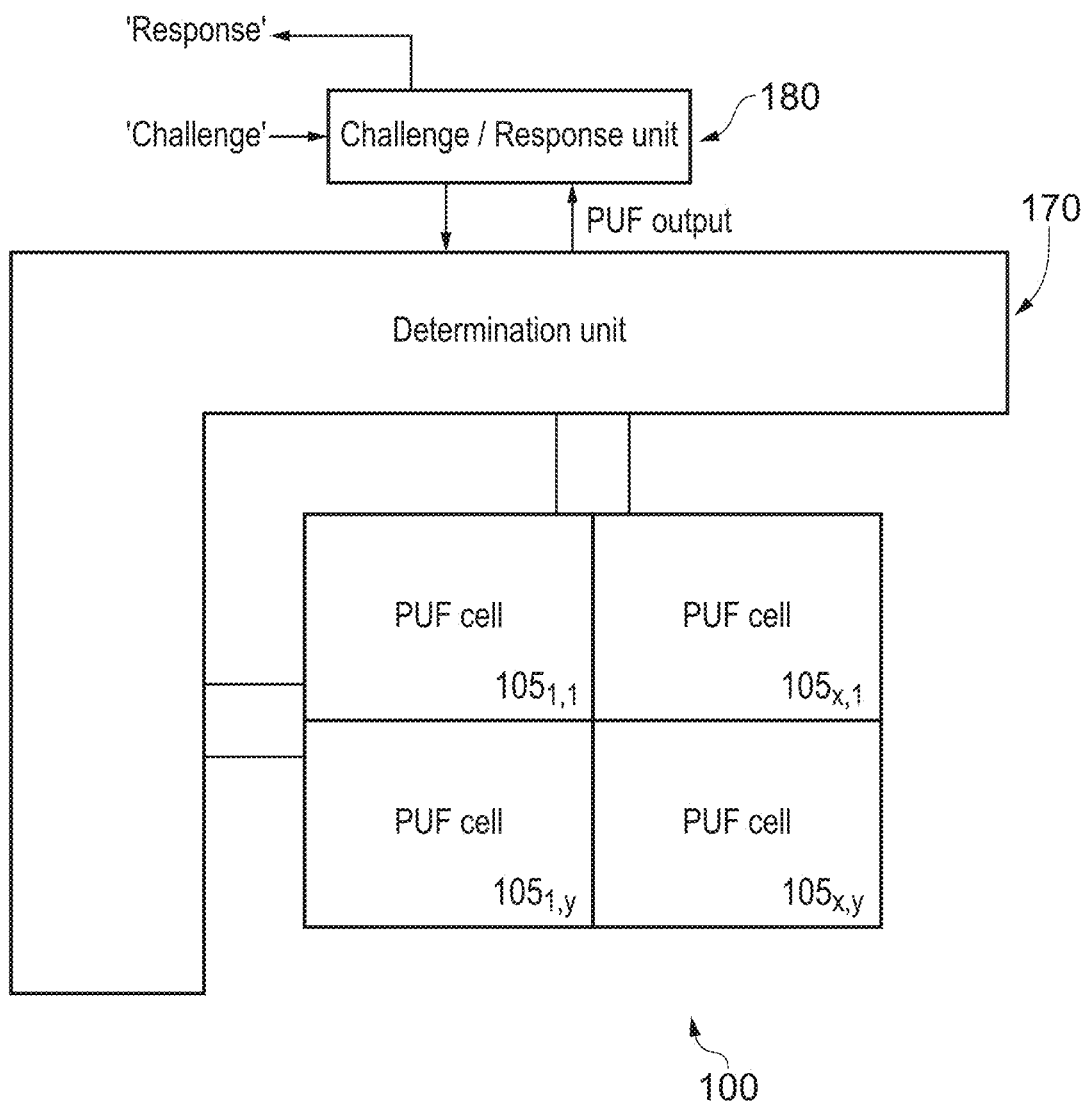
FIG. 1 shows an example schematic representation of a PUF apparatus/system 100 in accordance with an aspect of the present disclosure.

The inventor has identified many different challenges in implementing a PUF apparatus with one or more pairs of physical devices. First, each possible persistent random PUF value of each pair should have an equal, or substantially equal, probability. For example, if a pair of physical devices is used generate a '1' or a '0' depending on random manufacturing variations between the physical devices, there should be an equal, or substantially equal, probability of a '1' or a '0'. If this is not achieved, the output of the PUF apparatus may not be sufficiently random. Achieving this requires the PUF apparatus to be design not to favour any one particular possible PUF value from each pair of physical devices.

Second, since the random number generated by the PUF apparatus should be persistent, it is preferable that any physical device measurements/readings on which the random number is based are relatively stable and consistent over time. Therefore, it is preferable that any physical characteristics that are used to determine the value of the random number are relatively stable over time and are measured accurately and reliably over time, so that the random number remains the same (or the same within acceptable tolerances, such as the tolerances required for effective error correction coding, ECC).

The inventor has devised a technique for configuring each pair of physical devices, which sets the way in which the pair of devices is subsequently used during readout to determine a PUF value. The physical devices may be transistors or capacitors, as non-limiting examples. In the technique, the size of the physical characteristic of the pair of devices is determined during configuration (e.g., the size of the difference between the pair of physical devices/components is determined). Non-limiting examples of the physical characteristic include a voltage difference across a pair of transistors, a difference in gate-to-source voltages of a pair of transistors, a difference in capacitance of a pair of capacitors, or a difference in current through a pair of physical devices. The size of the physical characteristic is then compared against configuration thresholds in order to assign the pair of devices to a particular readout condition. A non-limiting example of a configuration threshold is a voltage threshold. The assigned readout condition then determines which readout thresholds should be used during PUF readout. The configuration thresholds may be different to the readout thresholds, such that there is a buffer between them. In this way, the readout condition set during configuration may be set such that the physical characteristic of a pair of devices measured during readout is likely to be a distance away from the readout threshold(s) that is to be used. Consequently, the measurement of physical characteristic may change or drift over time with low risk that they will change enough to cross over the readout threshold, causing the PUF value to change. Thus, the persistence of the PUF value generated by each pair of devices, and therefore the overall PUF output, may be improved. Furthermore, the configuration and readout thresholds may be set such that the probability of each PUF value for each pair of devices is equal, or substantially equal, thereby achieving randomness of the PUF values.

FIG. 1 shows an example schematic representation of a PUF apparatus/system 100 in accordance with an aspect of the present disclosure. The PUF apparatus comprises a plurality of PUF cells $105_{x,y}$, a determination unit 170 and a challenge/response unit 180. Whilst only a 2×2 array of PUF cells $105_{x,y}$ is represented, it will be appreciated that there may be any number of PUF cells, (for example, 8, 12, 20, 32, 128, 256, etc, etc) arranged in an array of any size and dimension, or arranged in any other suitable configuration.

The determination unit 170 is configured to determine a PUF output using the plurality of PUF cells $105_{x,y}$. The PUF output is a persistent random number. Each PUF cell $105_{x,y}$ comprises a pair of physical components/devices, where the determination unit 170 measures a difference in a physical characteristic of the pair of components/devices in a particular PUF cell $105_{x,y}$ in order to determine a persistent random PUF value. The determination unit 170 may repeat this for a plurality of the PUF cells $105_{x,y}$ and the plurality of determined persistent random values may then be used to generate the PUF output (for example, each persistent random value may be a 1-bit or multi-bit value that forms part of the PUF output. In one particular non-limiting example, the PUF output may be a 128-bit word, and 128 PUF cells may each contribute 1-bit to the 128-bit word).

The challenge/response unit 180 is configured to receive a 'challenge' from an external entity, request and obtain the PUF output from the determination unit 170 and then determine and return a response based on the challenge and the PUF output. The challenge/response unit 180 may be configured to operate in any suitable way that will be apparent to the person skilled in the art of PUF devices. The challenge/response unit 180 may form a separate unit, or may be part of the determination unit 170. The present disclosure is concerned specifically with the configuration and operation of the PUF cells $105_{x,y}$ and determination unit 170, as described in detail below. Therefore, no further reference to, or explanation of, the challenge/response unit 180 is given in this disclosure.

Example PUF Cell Implementations

Each PUF cell $105_{x,y}$ may comprise a pair of any suitable physical devices/components that are arranged to be compared in order to determine a difference in their physical characteristics, caused by random manufacturing differences.

For example, each PUF cell $105_{x,y}$ may comprise a pair of matched transistors and the determination unit 170 may be configured to determine a PUF output based on a difference between a physical characteristic (such as gate-source voltage) of the transistors that is caused by random manufacturing differences. Various example implementations of the PUF apparatus/system 100 where PUF cells $105_{x,y}$ each comprise a pair of transistors are given in U.S. patent application Ser. No. 16/296,998 (the '998 application), which is incorporated herein by reference in its entirety. Two particular example implementations are disclosed between FIGS. 2 to 9 and between line 16, page 10, to line 6, page 26 of the '998 application as filed, some of which is reproduced in part below.

Figure 2:
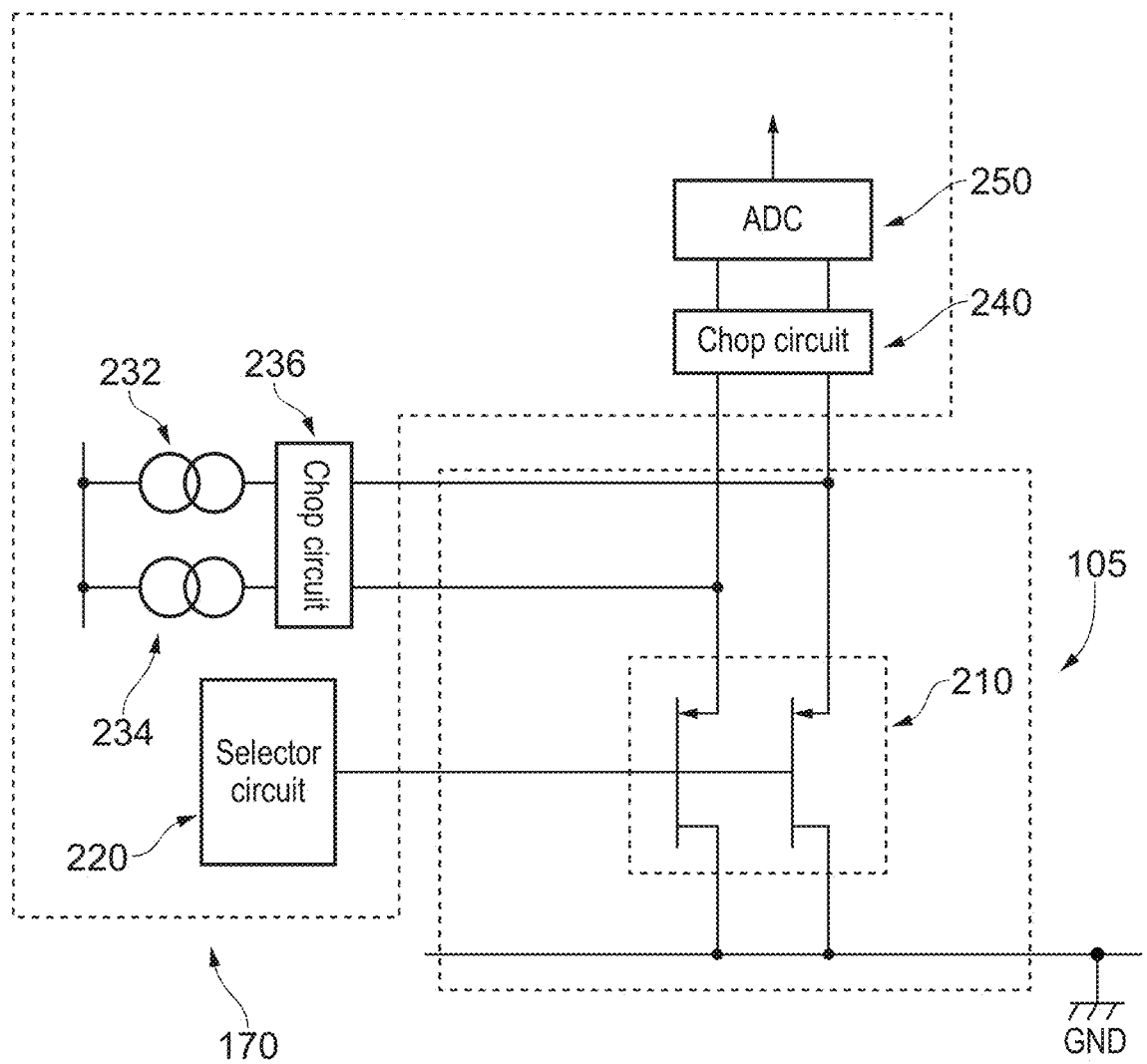
FIG. 2 shows a schematic diagram of an example implementation of a PUF cell 105 and determination unit 170 of FIG. 1.

FIG. 2 (which is reproduced from FIG. 2 of U.S. patent application Ser. No. 16/296,998) shows a schematic diagram of an example implementation of a PUF cell 105 and the determination unit 170 configured to determine a PUF value of the PUF cell 105.

Figure 3A:
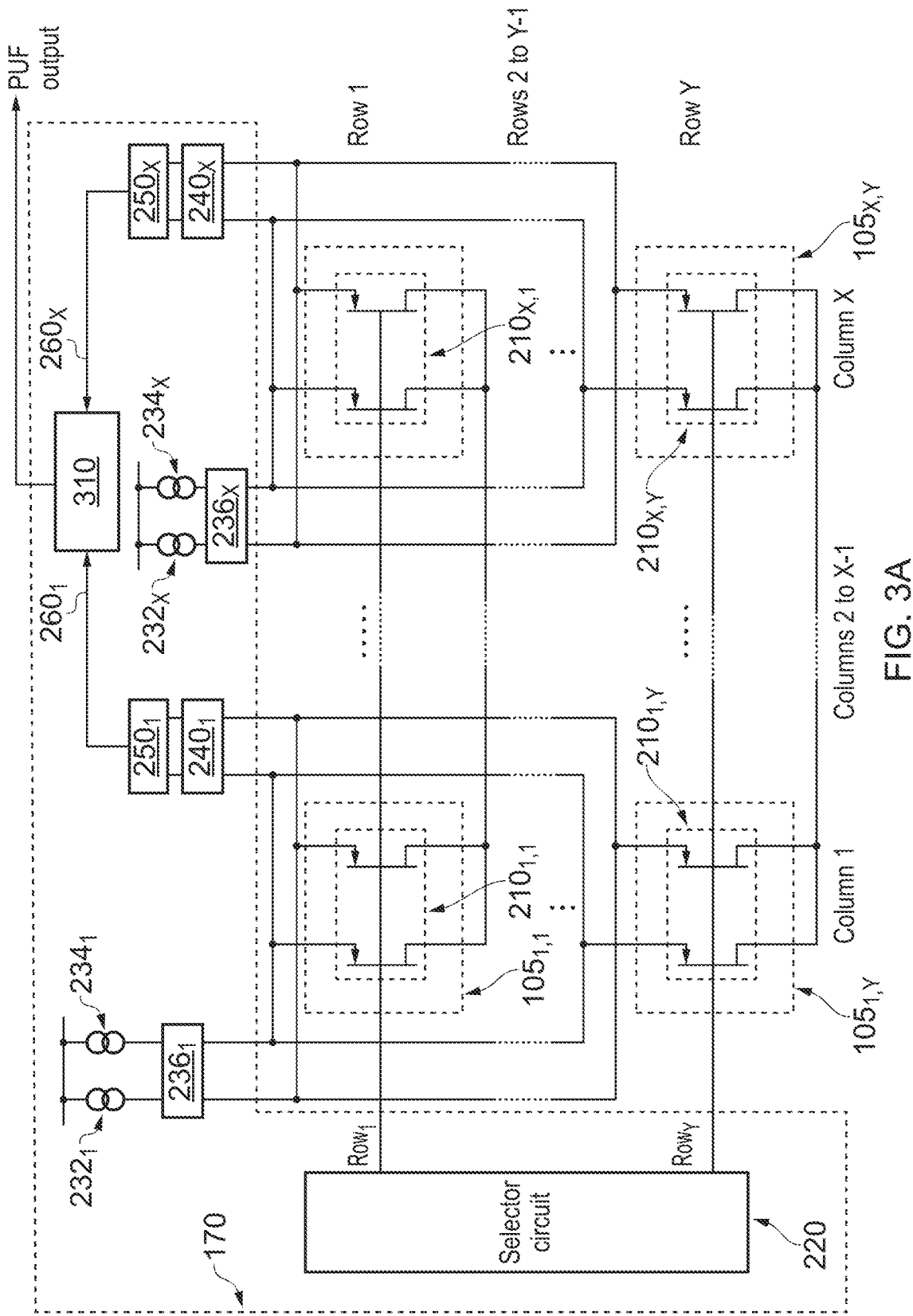
FIG. 3A shows a schematic diagram of an array of the PUF cells of FIG. 2.

FIG. 3A (which is reproduced from FIG. 3 of U.S. patent application Ser. No. 16/296,998) shows a schematic diagram of an array of PUF cells $105_{x,y}$ that are each configured in the same way as the PUF cell 105 represented in FIG. 2.

Returning to FIG. 2, the PUF cell 105 comprises a matched pair of transistors 210. The term 'matched' in this disclosure means that the pair of transistors are of identical design. Whilst FIG. 2 shows a representation of a matched pair of p-type FETs, it will be appreciated that throughout the present disclosure, in every different described aspect, the matched pair of transistors 210 may be of any transistor type, for example p-type, n-type, enhancement, depletion, FETs (such as MOSFETs, JFETs, MESFETs, etc), BJTs (such as IGBTs, heterojunction bipolar transistors, etc), etc. For the sake of simplicity, we focus specifically on FETs, but it should be appreciated that the terms 'gate', 'source' and 'drain' used herein encompass the terms 'base', 'emitter' and 'collector' of BJTs.

Whilst the two transistors making up the matched pair of transistors 210 are of identical design, in practice there will inevitably be small, random manufacturing variations between the two transistors. Those manufacturing variations may include at least one of: differences in gate oxide thickness, differences in doping densities, differences in carrier mobility, differences in device dimensions, etc. These manufacturing variations result in variations in transistor on-state characteristics/performance, such as differences in turn-on threshold voltage, differences in 3, differences in the back-gate effect, etc. The term 'on-state' is used herein to refer to an operational characteristic of a transistor relating to its normal on state operation, such as turn-on threshold voltage, gate-source voltage, drain current, linear resistivity, saturation point, transconductance, etc. By considering an on-state characteristic, as opposed to an off-state characteristic (such as off-state leakage current) or a failure characteristic (such as dielectric breakdown), reliability of the PUF apparatus 100 may be increased, since high voltages are not applied, gate oxides are not degraded, etc.

The determination unit 170 is configured to determine a transistor difference value based at least in part on a comparison of an on-state characteristic of the matched pair of transistors 210, wherein the transistor difference value is indicative of one or more random manufacturing differences between the matched pair of transistors 210. In this implementation, the compared on-state characteristic of the matched pair of transistors 210 is the gate-source voltage of the two transistors ($V_{GS}$). The $V_{GS}$ of the two transistors may differ as a result of one or many different random manufacturing differences that cause, for example, a difference in the turn-on threshold voltage and/or β and/or back-gate effect, of the transistors.

The drains of the matched pair of transistors 210 are coupled to ground. The determination unit 170 comprises a selector circuit 220 configured to apply a suitable voltage to the gates of the matched pair of transistors 210 in order to turn-on the transistors. This voltage functions as a 'selection potential', which is explained in more detail below with reference to FIG. 3A. The determination unit 170 also comprises a first current source 232 and a second current source 234, that are configured to provide the same amount of current as each other. The current from the first current source 232 may be applied as a first input signal to the source of a first transistor of the matched pair of transistors 210, and the current from the second current source 234 may be applied as a second input signal to the source of a second transistor of the matched pair of transistors 210. If the matched pair of transistors 210 were truly identical, their source voltages would be exactly the same. However, owing to random manufacturing differences, the gate-source voltages of the two transistors are likely to be different and, since the gate voltage applied to the matched pair of transistors 210 is the same, the source voltages of the matched pair of transistors 210 should be different by some amount.

The determination unit 170 further comprises an ADC 250 that is configured to measure the difference in the gate-source voltage and output a digital value indicative of the difference. However, it has been realised that there may be some mismatch between the currents provided by the first current source 232 and the second current source 234. Therefore, a chop circuit 236 may be provided so that the first input signal (the current from the first current source 232) may be applied to the first transistor, the second input signal (the current from the second current source 234) may be applied to the second transistor and a first transistor comparison value determined by the ADC 250 by comparing the gate-source voltages of the matched pair of transistors 210. Then, the chop circuit 236 may switch the coupling of the first current source 232 and the second current source 234 such that the first input signal is applied to the second transistor, the second input signal is applied to the first transistor and a second transistor comparison value is determined by the ADC 250 by comparing the gate-source voltages of the matched pair of transistors 210.

The first and second transistor comparison values may be expressed as:

First transistor mismatch value=$\Delta V_{GS}$+mismatch+ noise1

Second transistor mismatch value=$\Delta V_{GS}$−mismatch+ noise2

The transistor difference value for the PUF cell 105 may then be determined based on the first transistor comparison value and the second transistor comparison value, for example from a sum or an average of the first transistor comparison value and the second transistor comparison value.

For example, the transistor difference value may be expressed as:

$$\text{transistor difference value} = \frac{\text{first mismatch value} + \text{second mismatch value}}{}$$
$$= 2^*\Delta V_{GS} + \text{noise1} + \text{noise2}$$

Or $$\text{transistor difference value} = \frac{\text{avg of first mismatch value and second mismatch value}}{}$$
$$= \Delta V_{GS} + (\text{noise1} + \text{noise2})/2$$

In this way, any measurement inaccuracies caused by a mismatch between the first and second current sources 232 and 234 may be eliminated without appreciably increasing the signal to noise ratio. It will be appreciated that the chop circuit 236 is optional and the determination unit 170 may be configured to determine the transistor difference value from a single comparison of the gate-source voltages, for example if the first and second current sources are considered to be matched to a sufficiently high accuracy.

Furthermore, optionally, a further chop circuit 240 may be provided at the input to the ADC 250. This may operate similarly to the chop circuit 236, and at the same time as the chop circuit 236, in order to switch the coupling of differential inputs to a comparator in the ADC 250. In this case however, the sign of the $\Delta V_{GS}$ component in the first transistor comparison value will be different from the sign of the $\Delta V_{GS}$ component in the second transistor comparison value as a result of switching the inputs to the comparator in the ADC 250. For example, in the case where both chop circuit 236 and 240 are used:

First transistor mismatch value=$\Delta V_{GS}$+mismatch+ offset+noise1

Second transistor mismatch value=−$\Delta V_{GS}$+mismatch+offset+noise2 where offset is the offset of the ADC 250.

In this case, the transistor difference value may be determined by taking the difference of the first transistor comparison value and the second transistor comparison value. For example:

transistor difference value = first mismatch value−second mismatch value $$= 2^{*}\Delta V_{GS} + \text{noise1} - \text{noise2}$$

Using the chop circuit 236 in this way may help to cancel any offset in the ADC 250 and well as any mismatch between the first and second current sources 232 and 234. Furthermore, the $\Delta V_{GS}$ component has increased by 2× and low frequency components of noise1 and noise2 should mostly cancel each other out. However, it will be appreciated that the chop circuit 240 is optional, depending on the configuration of the ADC 250 and the quality of components making up the ADC 250. Furthermore, the determination unit 170 may not comprise an ADC 250, but may instead determine the transistor difference value using any other suitable circuitry, for example analog only circuitry.

The chop circuit 236 and further chop circuit 240 may be configured in any suitable way to perform the switching/ chopping functionality described above. For example, they may each comprise one or more switches that can be controlled (for example, by a control unit not represented in FIG. 2) to switch/chop the couplings as described above.

The transistor difference value is indicative of which of the transistors in the matched pair of transistors 210 has the larger/smaller $V_{GS}$ and the magnitude of the difference. For example, it may be a positive number of a magnitude indicative of the amount by which the Vis of the first transistor is larger than the $V_{GS}$ of the second transistor, and may be a negative number of a magnitude indicative of the amount by which the $V_{GS}$ of the first transistor is smaller than the $V_{GS}$ of the second transistor.

Turning to FIG. 3A, a plurality of PUF cells 105$_{x,y}$ are represented, where x=1, 2, . . . X−1, X and y=1, 2, . . . Y−1, Y, such that the overall number of PUF cells 105$_{x,y}$ totals X*Y. The PUF cells 105$_{x,y}$ in this example are arranged in an array comprising X columns and Y rows. The selector circuit 220 has Y outputs, one for each row of the array and it can be seen that each output is coupled to the gates of all of the matched transistor pairs 210$_{x,y}$ in a particular row (for example, the first output is coupled to transistor pairs 210$_{x,1}$, the second output is coupled to transistor pairs 210$_{x,2}$, etc). In order to select a particular row of PUF cells 105$_{x,y}$, the selector circuit 210 applies a selection potential to that row (for example, a potential that exceeds the turn-on threshold voltage of the transistors) in order to turn on the matched transistor pairs 210$_{x,y}$ in that row. A non-selection potential is applied to all other rows (for example, a potential that is less than the turn-on threshold voltage of the transistors). Thus, it can be seen that in this example, each matched transistor pair 210$_{x,y}$ is not only used for determining a transistor difference value, it is also used as a selection mechanism for its PUF cell 105$_{x,y}$. By using each matched pair of transistors 210$_{x,y}$ for both of these purposes, the size of the PUF cell array may be reduced compared with an array that includes a pair of transistors to be used for the determination of a PUF value, and one or more further transistors to be used to select a PUF cell.

It can also be seen that the determination unit 170 comprises X first and second current sources 232$_x$ and 234$_x$, X chop circuits 236$_x$, X further chop circuits 240$_x$ and X ADCs 250$_x$. Consequently, it is possible to determine, in parallel, transistor difference values for the X pairs of transistors 210$_{x,y}$ in a selected row, thereby increasing the speed of operation. Furthermore, each set of first and second current sources 232$_x$ and 234$_x$, chop circuit 236$_x$, further chop circuit 240$_x$ and ADC 250$_x$ may be shared by a column of the PUF array, thereby reducing the number of components required and thus the overall size, cost and power consumption of the PUF apparatus 100.

The determination unit 170 represented in FIG. 3A also comprises a PUF output unit 310 that either: a) receives the determined transistor difference value from each ADC 250$_x$, or b) receives the determined first and second transistor comparison values from each ADC$_x$ and then determines the transistor difference value based on the first and second transistor comparison values (for example, by averaging them).

The determination unit 170 may operate by selecting one row of PUF cells 105$_{x,y}$ and determining a transistor difference value for each selected PUF cell. Subsequently, the next row of PUF cells 105$_{x,y}$ may be selected and transistor difference values determined for them. The operation of the selector circuit 220, chop circuits 236$_x$ and further chop circuits 240$_x$ may be controlled in any suitable way, for example by the PUF output unit 310 or any other suitable controller. Control interconnections are not represented in FIG. 3A for the sake of simplicity.

Figure 3B:
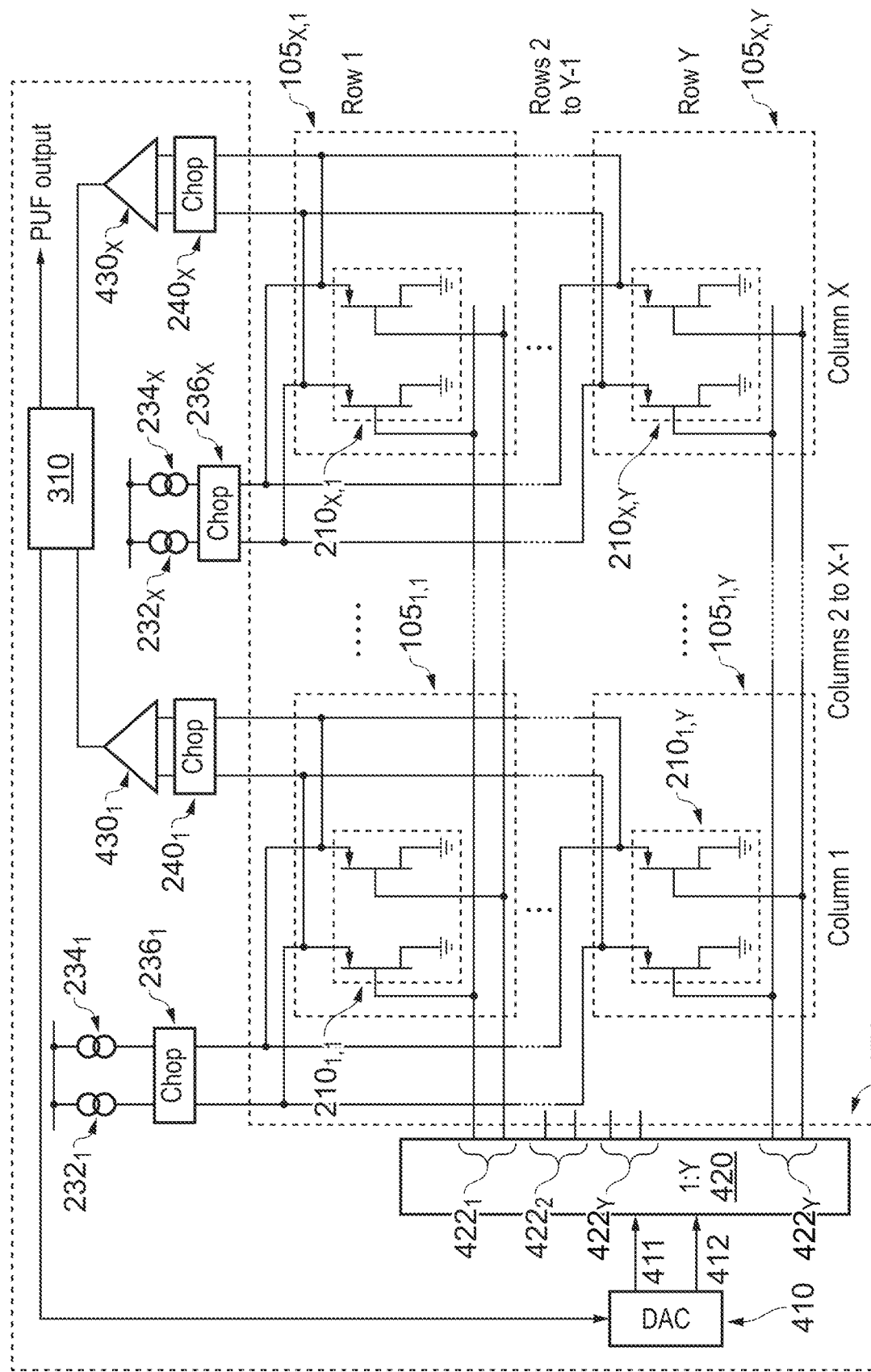
FIG. 3B shows a schematic diagram of a further example implementation of the PUF apparatus/system 100.
Figure 6:
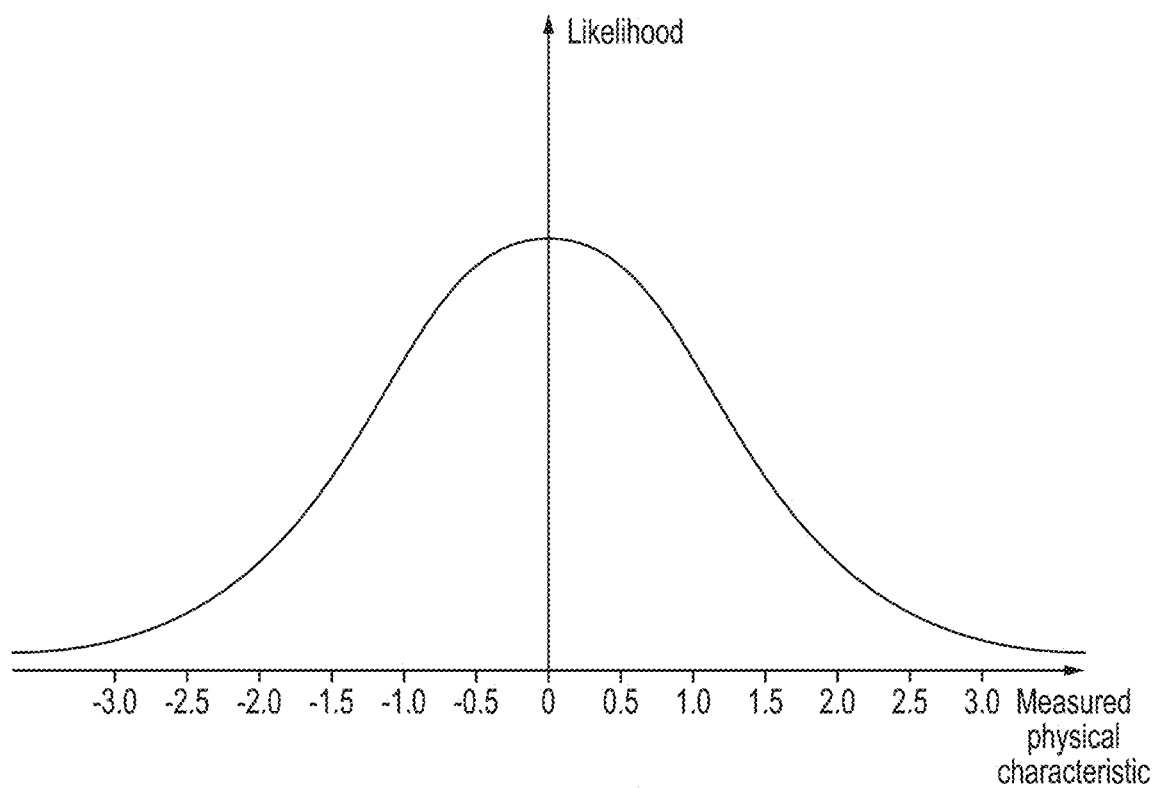
FIG. 6 shows an example statistical distribution of measured physical characteristics across a plurality of PUF cells of FIG. 1.

FIG. 3B (which is reproduced from FIG. 6 of U.S. patent application Ser. No. 16/296,998) shows a schematic diagram of an alternative configuration of an array of PUF cells 105$_{x,y}$ and a determination unit 170. A detailed explanation of the operation of the circuit is given between line 5, page 18, to line 23, page 23, of U.S. Ser. No. 16/296,998 and will not be repeated herein for the sake of efficiency. However, it will be appreciated that FIG. 3B should a further example representation of how the PUF apparatus 100 may be implemented in such a way that parallel measuring of the physical characteristic of a plurality of PUF cells 105$_{x,y}$, and parallel readout of a plurality of PUF cells 105$_{x,y}$, may be achieved.

The PUF output determined by the PUF output unit 310 is a persistent random number that may be, for example, a multi-bit number. This is explained in more detail later in the "Configuration" and "Readout" sections. However, in summary, the measured transistor difference value of a particular PUF cell may be used to set the value (i.e., "0" or "1") of one or more bits of the multi-bit PUF output. Since the outcome of each transistor comparison is dependent on random manufacturing differences between the matched pair of transistors 210$_{x,y}$, it can be seen that the PUF output should be random, in that each different instance of PUF apparatus 100 is highly likely to generate a randomly different PUF output.

In a further example implementation, each PUF cell 105$_{x,y}$ may comprise a pair of capacitors and the determination unit 170 may be configured to determine a PUF output based on a difference between a physical characteristic (such as the capacitance) of the capacitors that is caused by random manufacturing differences. Various example implementations of the PUF apparatus/system 100 where PUF cells 105$_{x,y}$ each comprise a matched pair of capacitors are given in U.S. patent application Ser. No. 16/716,435 (the '435 application), which is incorporated herein by reference in its entirety. Various example implementations are disclosed between FIG. 2A to 6B and between line 10, page 10, to line 31, page 22 of the '435 application as filed, some of which is reproduced in part below.

Figure 4A:
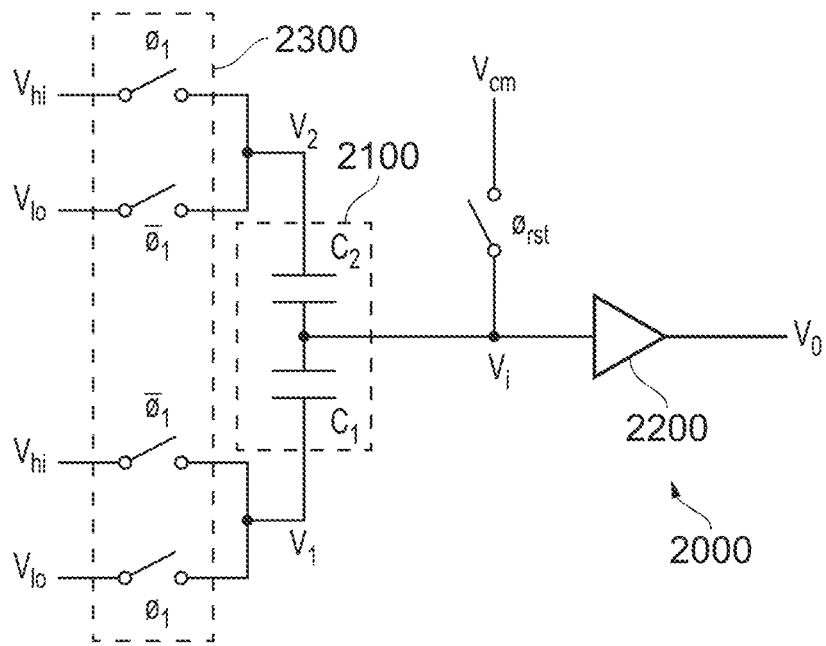
FIG. 4A shows a schematic diagram of a circuit for determining a capacitor difference value.

FIG. 4A (which is reproduced from FIG. 2A of U.S. patent application Ser. No. 16/716,435) shows a schematic diagram of a circuit for determining a capacitor difference value indicative of a random manufacturing difference between a pair of capacitors 2100.

Figure 4B:
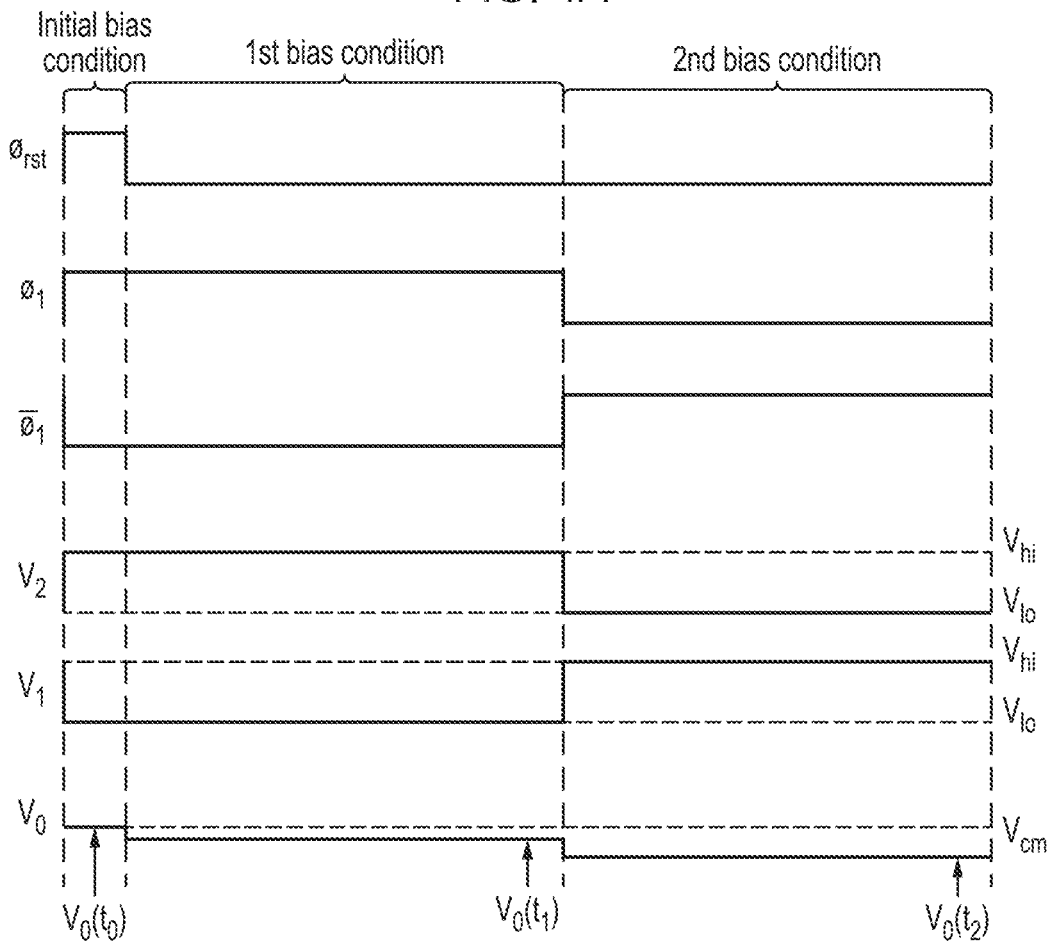
FIG. 4B shows an example timing diagram of the operation of the circuit of FIG. 4A.
Figure 4C:
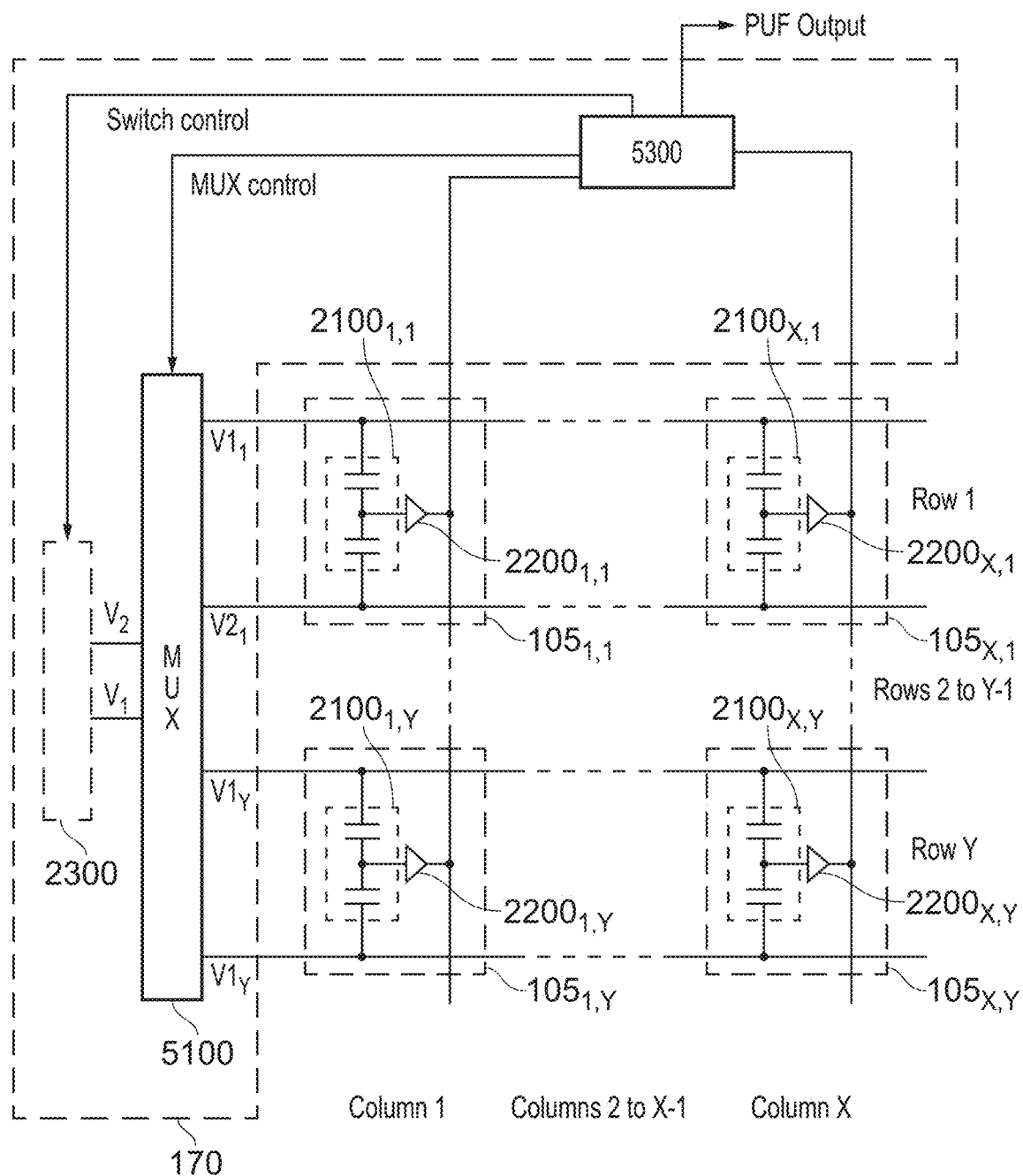
FIG. 4C shows a schematic diagram of an array of the PUF cells of FIG. 4A.

FIG. 4C (which is reproduced from FIG. 3 of U.S. patent application Ser. No. 16/296,998) shows a schematic diagram of an array of PUF cells 105$_{x,y}$ that are each configured in the same way as the PUF cell 105 represented in FIG. 4A.

Returning to FIG. 4A, each PUF cell 105$_{x,y}$ may comprise a pair of capacitors 2100$_{x,y}$, such that each PUF cell 105$_{x,y}$ may be used to generate a corresponding capacitor difference value, based on which a persistent random PUF value for the PUF cell 105$_{x,y}$ can be determined (similarly to the above description with reference to FIG. 3A). The PUF output can then be determined from a plurality of persistent random PUF values determined from a plurality of PUF cells 105$_{x,y}$. However, for the sake of simplicity, the determination of a capacitor difference value from a single pair of capacitors 2100 shall be described below.

The pair of capacitors 2100 may be a matched pair of capacitors, or they may be different capacitors. The term 'matched' in this disclosure means that the pair of capacitors are of identical design. Whilst the two capacitors making up the matched pair of capacitors 2100 are of identical design, in practice there will inevitably be small, random manufacturing variations between the two capacitors. Those manufacturing variations may include at least one of: differences in distance between the capacitor plates (for example, caused by differences in dielectric thickness), differences in the area of overlap of the two plates, differences in dielectric constant, etc. These manufacturing variations result in variations in capacitance between the two capacitors making up the matched pair of capacitors 2100. Whilst the below description will focus on a matched pair of capacitors 2100 for simplicity, it should be appreciated that in an alternative the two capacitors 2100 may be of different design. In this case, there will be some expected difference between their capacitances, on top of which random manufacturing differences should introduce some random variation around the expected difference. Consequently, the capacitor difference value that is determined according to the processes described below may perform the same function as when the capacitors are matched, but with an offset applied to the random variation, that offset being equal to the design difference in capacitance of the two capacitors.

The circuit of FIG. 4A comprises a switch bank 2300 that may be used to set bias conditions for determining the capacitor difference value indicative of the random manufacturing difference between the first capacitor $C_1$ and the second capacitor $C_2$. The first capacitor $C_1$ and the second capacitor $C_2$ are arranged as a capacitor divider, wherein the two capacitors share a common node, or centre tap. The circuit further comprises a buffer 2200 for buffering the signal at the common node between the first capacitor $C_1$ and the second capacitor $C_2$. The buffer may be any suitable type of voltage buffer (for example a source follower, a simple opamp, etc) that is configured to output a voltage $V_o$, or current, that is indicative of the voltage $V_i$ at the common node or centre tap of the capacitor divider. Each of the switches in the circuit may be implemented by any suitable type of controllable switch, for example each switch may be implemented by a transistor such as a FET or a bipolar transistor. The state of each switch may be controlled by a controller that is not represented in FIG. 4A for the sake of simplicity.

FIG. 4B (which is reproduced from FIG. 2B of U.S. patent application Ser. No. 16/716,435) shows an example timing diagram of the operation of the circuit of FIG. 4A. The timing diagram in FIG. 4B represents timings of switch control signals $\varnothing 1$, $\overline{\varnothing 1}$ and $\varnothing_{rst}$, and the relative voltages $V_1$, $V_2$ and $V_o$. Initially, an initial bias condition is set, where $\varnothing_{rst}$ closes the reset switch so that a common mode voltage $V_{cm}$ (an initialisation voltage, which may be at any suitable voltage level, for example in consideration of the components in the circuit, such as which buffer 2200 is used, etc) is applied to the common node or centre tap of the two capacitors. During the initial bias condition, the voltage of $V_2$ is held relatively high ($V_{hi}$) and the voltage of $V_1$ is held relatively low ($V_{lo}$). $V_{hi}$ and $V_{lo}$ may be set to any suitable size, for example depending on the size and type of capacitors used. The output voltage at a time to during the initial bias condition may be expressed as:

$$V_o(t_0) = V_{cm} + V_{off} + V_n(t_0)$$

where $V_{off}$ is the offset of readout, caused by any inherent offset in the buffer 2200, and $V_n(t_0)$ is the random readout noise at time $t_0$.

A first bias condition is then set by opening the reset switch such that the common node is no longer held at $V_{cm}$. This means that a first bias voltage $V_{hi}-V_{lo}$ is applied across the pair of capacitors 2100 without the common node or centre tap being held to any particular potential. The first bias condition thereby sets a corresponding first charge distribution between the two capacitors. In the timing diagram of FIG. 4B, a change in $V_o$ is represented when the bias condition changes from the initial condition to the first condition. This change is a result of charge injection and capacitive coupling of the reset switch. The output voltage at a time $t_1$ during the first bias condition may be expressed as:

$$V_o(t_1) = V_{cm} + V_{off} + V_{ci} + V_{ktc} + V_n(t_1)$$

where $V_{ci}$ is the charge injection from the rst switch caused by the switch opening, $V_n(t_1)$ is the random readout noise at time $t_1$ and $V_{ktc}$ is sampled KTC noise from the two capacitors. The value $V_o(t_1)$ shall be referred to as a first nodal measurement that is indicative of a voltage at the common node of the capacitor divider 2100 during the first bias condition.

A second bias condition is then set by applying the first bias voltage across the pair of capacitors 2100 in the opposite direction, such that the voltage across the pair of capacitors 2100 is $-(V_{hi}-V_{lo})$. This is achieved by controlling the switch bank 2300 to apply $V_{lo}$ to $V_2$ and apply $V_{hi}$ to $V_1$. In the timing diagram of FIG. 4B, a change in $V_o$ can be seen when the bias condition changes from the first condition to the second condition, which is caused by a redistribution of charge between the first capacitor and the second capacitor. $V_o$ is represented as decreasing when the second bias condition is applied, which is a result of the capacitance of $C_2$ being greater than that of $C_1$. If, however, the capacitance of $C_1$ were greater than that of $C_2$, $V_o$ would instead increase when the second bias condition is applied. The output voltage at a time $t_2$ during the second bias condition may be expressed as:

$$V_o(t_2) = V_{cm} + V_{off} + V_{ci} + V_{ktc} + V_n(t_2) + ((C_1 - C_2)/(C_1 + C_2)) * (V_{hi} - V_{lo})$$

The value $V_o(t_2)$ shall be referred to as a second nodal measurement that is indicative of a voltage at the common node of the capacitor divider 2100 during the first bias condition.

Because the pair of capacitors are matched, by design their capacitance is $C_1=C_2=C$. However, in practice, there is a small, random difference in their capacitance, such that $C_1-C_2=dC$. Therefore, we can express the actual capacitance of $C_1$ and $C_2$ as:

$$C_1=C+dC/2$$

$$C_2=C-dC/2$$

Substituting this into the equation above, we arrive at:

$$V_o(t_2)=V_{cm}+V_{off}+V_c+V_{ktc}+V_n(t_2)+(dC/2C)*(V_{hi}-V_{lo})$$

Whilst $V_o(t_2)$ is a function of the random manufacturing difference (dC) between the capacitors, it is also affected by a number of different sources of noise. Consequently, $V_o(t_2)$ may not be a reliable indicator of the random manufacturing difference, particularly considering that dC may be very small and therefore susceptible to being lost in noise.

However, by taking the difference of $V_o(t_2)-V_o(t_1)$, we arrive at:

$$V_o(t_2)-V_o(t_1)=(dC/2C)*(V_{hi}-V_{lo})+V_n(t_2)-V_n(t_1)$$

By taking the difference in this way, ktc noise $V_{ktc}$, the offset $V_{off}$, the charge injection signal $V_{ci}$, and the common mode signal, $V_{cm}$, are all cancelled out. Furthermore, any low frequency components in the readout noise $V_n(t_0)$ and $V_n(t_1)$ should also substantially cancel. Therefore, by measuring $V_o$ under both first and second bias conditions and then finding the difference, a more accurate measure of the random manufacturing difference between the two capacitors $C_1$ and $C_2$ can be found. The difference between $V_o(t_2)$ and $V_o(t_1)$ may be referred to as the capacitor difference value, that is indicative of a random manufacturing difference between the pair of capacitors 2100. This more accurate measure can then be used to determine a persistent random PUF value, based on which the PUF output can be determined, for example setting the value of one bit in a multi-bit PUF output, as explained in more detail below in the "Configuration" and "Readout" sections.

For example, the size of the capacitor difference value $(V_o(t_2)-V_o(t_1))$ of a particular PUF cell 105$_{x,y}$ may be used to set a persistent random PUF value (eg, to "0" or "1"), which then acts as one or more bits of the multi-bit PUF output. Since the capacitor difference value $V_o(t_2)-V_o(t_1)$ has been determined in a way that maximises the accuracy of measurement of dC by eliminating almost all noise, the value of the PUF output is determined almost exclusively by the random manufacturing difference. This should result in the value of the PUF output being sufficiently random to meet PUF requirements.

Turning to FIG. 4C, the determination unit 170 comprises a MUX 5100, a PUF output unit 5300 and the switch bank 2300. The PUF output unit 5300 is configured to control the switch bank 2300 and the MUX 5100 so as to apply voltages $V_{hi}$ and $V_{lo}$ to a particular row of PUF cells and apply a deselection voltage to all other rows of PUF cells. By doing so, it will be appreciated that, in parallel, the physical characteristic of the plurality of PUF cells in the selected row may be measured. Consequently, very fast measurement and readout may be achieved.

In the above, a number of particular examples have been given for measuring a physical characteristic of the PUF cell (in one example the physical characteristic is a difference in gate-source voltage of a pair of transistors and in the other example the physical characteristic is a difference in capacitance of a pair of capacitors), wherein the measurement of the physical characteristic is indicative of a random manufacturing variation of the PUF cell. However, it will be appreciated that there are many other ways in which pairs of devices and the determination unit 170 may be configured to determine a persistent random value for each PUF cell based on physical characteristics of pairs of devices. Furthermore, there are many other types of physical, electrical devices (either single components that may be active or passive, such as transistors or capacitors, or more complex composite devices that each comprise a plurality of components, such as ring oscillators, etc) that may be used for the pairs of devices and many other types of physical characteristics that may be measured. For example, each PUF cell may comprise a pair of identical strings of NOT gates, wherein the physical characteristic of the PUF cell is the time difference in how long it takes a signal to pass through one of the strings of NOT gates compared with how long it takes a signal to pass through the other string of NOT gates. It will be appreciated that the present disclosure is not limited to any particular implementation of PUF apparatus/system and may be applied to any implementation where a physical characteristic, indicative of a random manufacturing variation between a pair of devices, may be used to determine a persistent random PUF value.

'Configuration'

The term 'configuration' as used in the context of a process is used herein to refer to a process of assigning a particular readout condition to a pair(s) of devices that are to be used in the generation of a persistent random PUF value(s). For example, a readout condition may be assigned to each of at least some of the PUF cells 105$_{x,y}$ in the PUF apparatus 100. It may be performed once (e.g., during manufacture/set-up of the PUF apparatus 100, also sometimes referred to as "enrollment"), after which the PUF apparatus 100 may be used for 'readout', also sometimes referred to as "recovery". The term 'readout' is used herein to describe the process of determining a persistent random PUF value(s) based on a physical characteristic of one or more pairs of devices (e.g., PUF cells 105$_{x,y}$). Readout may be performed many times over the life of the PUF apparatus 100, each time a PUF output is required from the PUF apparatus 100. The readout condition assigned to a PUF cell 105$_{x,y}$ during configuration may dictate how a physical characteristic of that PUF cell 105$_{x,y}$ is to be used to determine a PUF value during readout. The usage of the term "configuration" as described above does not alter the meaning of the term "configuration" in the context of a physical configuration (e.g., a configuration of devices).

Described below are three different PUF apparatus 100 configurations that may be implemented in order to achieve different readout characteristics, referred to below as "1-bit per PUF cell—throw away", "1-bit per PUF cell—shift threshold" and "Multi-bit per PUF cell". For each of these, the configuration and readout process is slightly different, as will be explained in more detail later. However, the common aspects of the configuration process are first described with reference to FIG. 5.

The below explanations refer specifically to PUF cells 105$_{x,y}$, each of which comprise a fixed pair of devices (i.e., the device pairings cannot be changed in this example). However, it should be appreciated that the described processes may be applied to other types of PUF apparatuses that comprise other configurations of pairs of devices, for example PUF apparatus that dynamically selects two devices from a bank(s) of devices to form a pair of devices. In that example, one particular device may be part of a number of different pairs of devices, as different second devices are dynamically selected to form different pairs with that one particular device. Therefore, throughout the description below, the term 'PUF cell' can be substituted more generally with 'pair of devices'.

Figure 5:
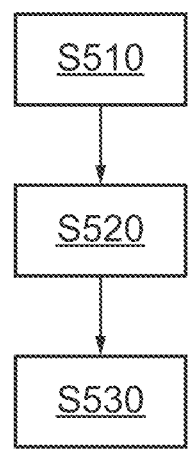
FIG. 5 shows example steps in a method of configuring a PUF cell of FIG. 1 in accordance with an aspect of the present disclosure.

FIG. 5 shows a visualisation of example steps in a method of configuring a PUF cell $105_{x,y}$ in accordance with an aspect of the present disclosure. This method may be performed for some or all of the PUF cells $105_{x,y}$ in the PUF apparatus/system 100 in order to configure some or all of the PUF cells $105_{x,y}$.

In Step 510, the determination unit 170 measures a physical characteristic of a PUF cell $105_{x,y}$ (eg a transistor difference value or a capacitor difference value, described earlier), wherein the measurement of the physical characteristic is indicative of a random manufacturing variation of the PUF cell. For example, the processes described above with respect to FIGS. 2, 3, 4A and 4B may be carried out in order to determine a transistor difference value or a capacitor difference value for a PUF cell $105_{x,y}$. Alternatively, any other suitable physical characteristic of the PUF cell $105_{x,y}$ may be determined using any suitable technique, depending on the components in each PUF cell $105_{x,y}$ and/or the design and configuration of the determination unit 170.

FIG. 6 shows an example statistical distribution of measured physical characteristics across a plurality of PUF cells $105_{x,y}$. The x-axis represents the measured physical characteristic and the y-axis represents likelihood/probability. The x-axis units are arbitrary as they will depend on the nature of the physical characteristic being measured. However, a positive value indicates that a first device/component in a PUF cell $105_{x,y}$ is larger than a second device/component in the PUF cell $105_{x,y}$. A negative value indicates that the measured characteristic of the second device/component is larger than the measured characteristic of the first device/component. The statistical distribution may be arrived at by measuring the physical characteristics of some or all PUF cells $105_{x,y}$, or by assuming a particular statistical distribution for the plurality of PUF cells $105_{x,y}$. In this example, a normal distribution has been assumed, but it will be appreciated that any other suitable type of distribution may be assumed.

In Step 520, the determination unit 170 may compare the measurement of the physical characteristic against one or more configuration thresholds. The one or more configuration thresholds used depends on the desired readout characteristic ("1-bit per PUF cell—throw away", "1-bit per PUF cell—shift threshold" and "Multi-bit per PUF cell") and will be described in more detail later.

In Step S530, the determination unit 170 may set, based on the comparison performed in Step S520, a configuration indicator associated with the PUF cell $105_{x,y}$ to indicate that during readout of the PUF cell $105_{x,y}$, either a first readout condition should be used, or a second readout condition should be used. The configuration indicator may be a 1-bit value (for example, set to "0" to assign the PUF cell to the first readout condition and set to "1" to assign the PUF cell to the second readout condition, or vice-versa), or may be any other suitable form of indicator that may be used during readout to determine which readout condition to use for a PUF cell $105_{x,y}$. The configuration indicator may be stored in memory, for example in the determination unit 170 or elsewhere, such that when a PUF cell $105_{x,y}$ is later being readout, its configuration indicator may be looked-up and used during readout. Consequently, each PUF cell $105_{x,y}$ may have an associated configuration indicator that is set during configuration and stored so that it may be used during readout.

The first read-out condition indicates that when generating a persistent random PUF value during readout of a PUF cell $105_{x,y}$, the physical characteristic of the PUF cell should be compared against at least one first readout condition threshold that is different to the at least one configuration threshold. The second read-out condition may indicate a number of different things, depending on which readout characteristic ("1-bit per PUF cell—throw away", "1-bit per PUF cell—shift thresholds" and "Multi-bit per PUF cell") has been implemented. This is explained in more detail later in the "readout" section.

The different readout characteristics have all been devised by the inventor as different ways in which the stability and consistency of each determined PUF value may be maintained over time. As explained earlier, the PUF output generated by the PUF apparatus 100 should be persistent over time. Consequently, the PUF value generated for each PUF cell $105_{x,y}$ should also be persistent over time. However, the inventor has recognised that the measured physical characteristic of a PUF cell $105_{x,y}$ is likely to vary over time, owing to one or more of: noise in the measurement of the physical characteristic, device degradation, environmental changes, locality changes, etc. This may sometimes cause difficulties in maintaining the persistence of the PUF value for a PUF cell $105_{x,y}$, as explained below with reference to FIG. 7.

Figure 7:
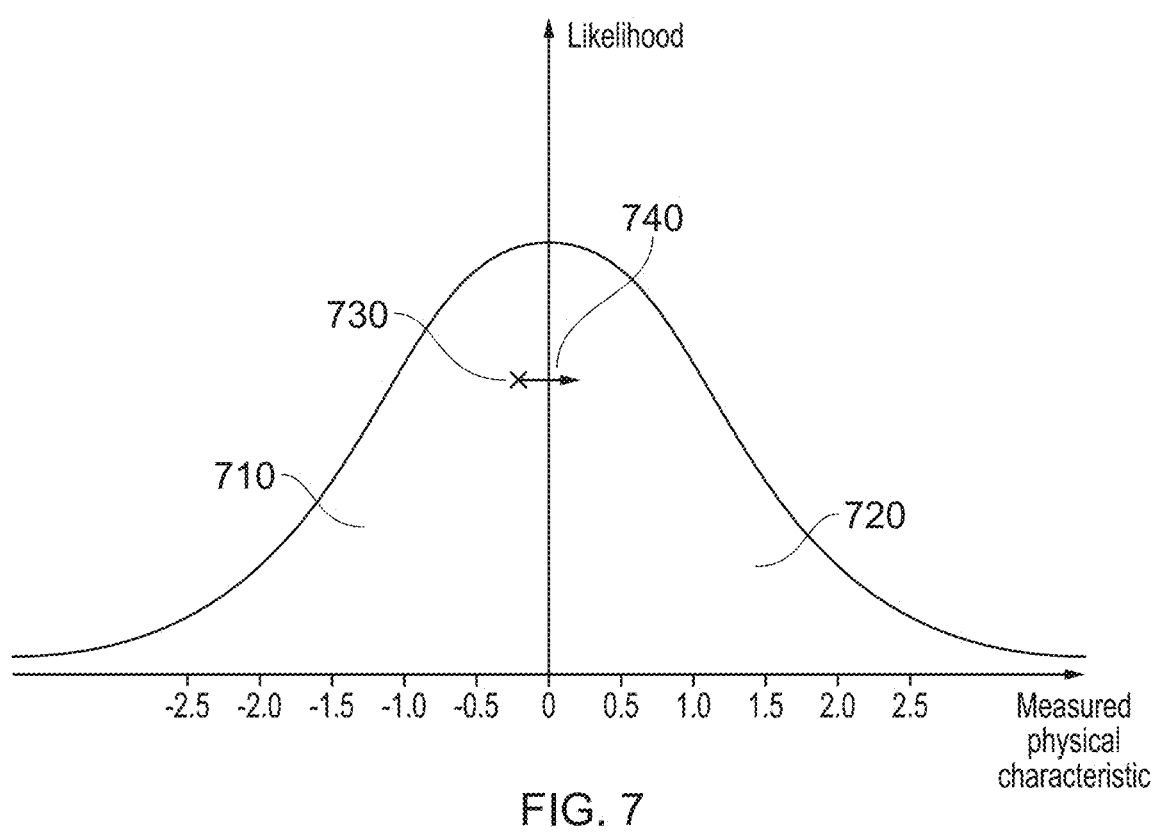
FIG. 7 shows a further example of the statistical distribution of FIG. 6.

FIG. 7 shows an example statistical distribution, similar to that of FIG. 6. In this example, it is assumed that the area under the graph in the negative part of the plot is equal to the area under the graph in the positive part of the plot. Consequently, the likelihood of any one PUF cell $105_{x,y}$ having a negative measured physical characteristic is equal to the likelihood of having a positive measured physical characteristic. Consequently, the determination unit 170 may be configured to readout a PUF cell $105_{x,y}$ by setting the persistent random PUF value to "0" when the measured physical characteristic is in the negative range 710, and to "1" when the measured physical characteristic is in the positive range 720.

However, an example measured physical characteristic for a particular PUF cell $105_{x,y}$ is represented with reference numeral 730. Initially, the measured physical characteristic 730 may be a negative value, such that that PUF cell $105_{x,y}$ generates a PUF value of "0". Over time, however, the measured physical characteristic may change or drift, as represented with reference numeral 740. If the measured physical characteristic increases over time, eventually it may become a positive value, at which time the persistent random PUF value would change from "0" to "1". This change would also cause a change in the PUF output. In some examples, the change in the measured physical characteristic may cause the measured physical characteristic to be positive sometimes, then negative sometimes, then positive sometimes, etc, resulting in the PUF value regularly changing between "0" and "1". ECC techniques may be able to tolerate a small number of bits in the PUF output changing over time, but a larger number would mean that the PUF output would no longer be persistent, at which time it could not be relied upon. The inventor has recognised that PUF cells $105_{x,y}$ with a measured physical characteristic that is close to the readout threshold used to determine whether the PUF value should be a "0" or "1" may be particularly susceptible to this problem, since relatively small changes in the measured physical characteristic over time may cause the PUF value to change. Therefore, the inventor has devised the configuration and readout processes described below to address these issues and improve the long term reliability and persistence of the PUF output generated by the PUF apparatus 100.

1-bit Per PUF Cell—Throw Away

In this implementation, configuration is performed so that some PUF cells 105$_{x,y}$ are assigned to be used during readout for determination of persistent random PUF values and other PUF cells 105$_{x,y}$ are assigned not to be used during readout at all ('thrown away'). In this example, setting a configuration indicator to assign a PUF cell 105$_{x,y}$ to the second condition indicates that the PUF cell 105$_{x,y}$ should not be used for generating a persistent random PUF value.

Figure 8:
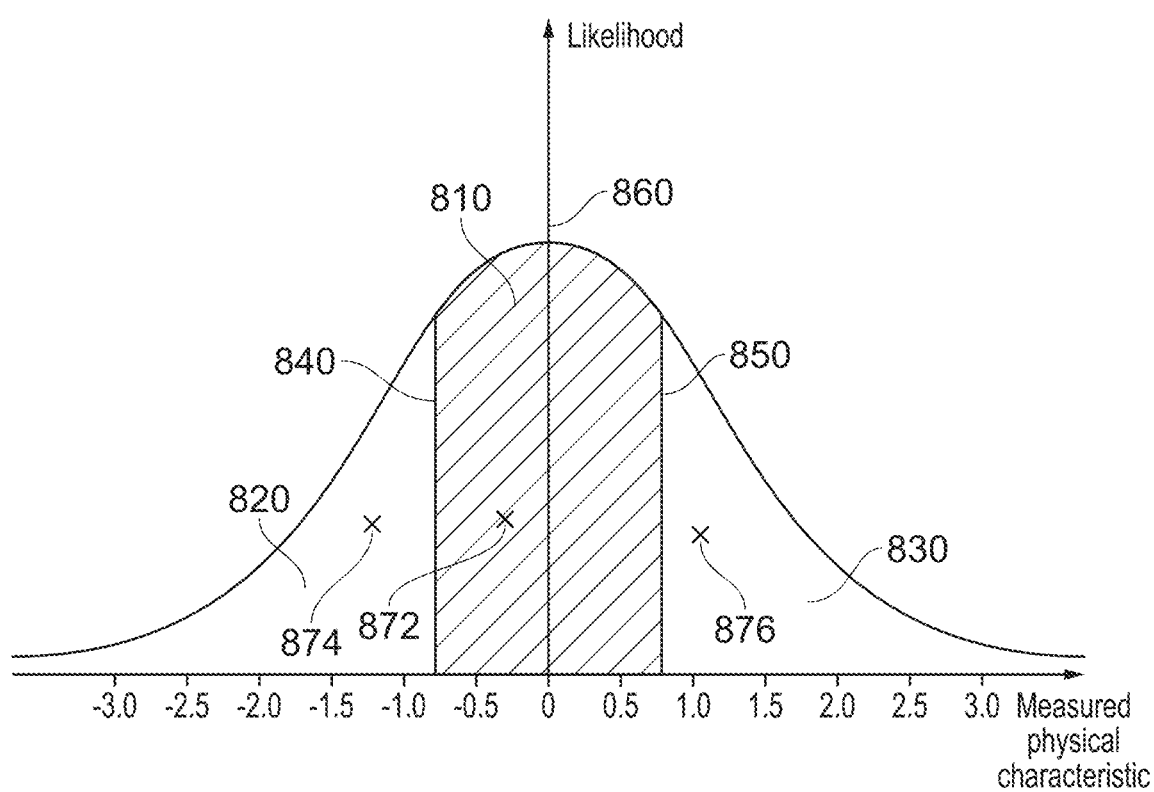
FIG. 8 shows an example statistical distribution demonstrating a configuration of the present disclosure.

FIG. 8 shows an example statistical distribution demonstrating 1-bit per PUF cell—throw away. The statistical distribution for the plurality of PUF cells 105$_{x,y}$ may be an assumed distribution or may be determined by measuring the physical characteristic of some or all of the PUF cells 105$_{x,y}$. The figure shows a first configuration threshold 840, a second configuration threshold 850 and a first readout condition threshold 860. In this configuration, during readout a single PUF cell 105$_{x,y}$ may be used to determine a 1-bit persistent random PUF value, such that a plurality of PUF cells 105$_{x,y}$ may be used to determine a plurality of 1-bit persistent random PUF values, which can then be used to determine a multi-bit PUF output.

During configuration of a PUF cell 105$_{x,y}$, the physical characteristic of the PUF cell 105$_{x,y}$ may be measured (step S510 in FIG. 5 above). The measured physical characteristic is then compared with the first configuration threshold 840 and the second configuration threshold 850 (step S520 in FIG. 5 above).

Then, in step S530, if it is between the first configuration threshold 840 and the second configuration threshold 850, the configuration indicator of that PUF cell 105$_{x,y}$ to assigned to the second readout condition, which means that that PUF cell 105$_{x,y}$ should not be used during readout. If, however, the measured physical characteristic is less than the first configuration threshold 840, or is greater than the second configuration threshold 850, the configuration indicator of that PUF cell 105$_{x,y}$ is assigned to the first readout condition, which means that during readout, that PUF cell 105$_{x,y}$ should be used for generating a persistent random PUF value. Thus, during configuration any PUF cells 105$_{x,y}$ that have a measured physical characteristic within the central region 810 are assigned to the second readout condition and any PUF cells 105$_{x,y}$ that have a measured physical characteristic within the outer regions 820 and 830 are assigned to the first readout condition. For example, FIG. 8 shows an example particular PUF cell 105$_{x,y}$ having a measured physical characteristic 872 of −0.5. The configuration indicator for that particular PUF cell 105$_{x,y}$ would be set to assign the PUF cell 105$_{x,y}$ to the second readout condition. FIG. 8 also shows another example PUF cell 105$_{x,y}$ having a measured physical characteristic 874 of −1.5. The configuration indicator for that particular PUF cell 105$_{x,y}$ would be set to assign the PUF cell 105$_{x,y}$ to the first readout condition. FIG. 8 also shows another example PUF cell 105$_{x,y}$ having a measured physical characteristic 876 of 1.0. The configuration indicator for that particular PUF cell 105$_{x,y}$ would be set to assign the PUF cell 105$_{x,y}$ to the first readout condition.

The inventor has devised '1-bit per PUF cell—throw away' so that PUF cells 105$_{x,y}$ that have been determined to have a physical characteristic that is relatively close to the readout threshold 810 are not subsequently used during readout. This is because these PUF cells 105$_{x,y}$ have a relatively high risk of having a PUF value that changes over time as a result of the physical characteristic measured during readouts changing by enough to move from one side of the readout threshold 810 to the other. The PUF cells 105$_{x,y}$ that have a measured physical characteristic that is relatively far away from the readout threshold 810 are then subsequently used during readout. This is because these PUF cells 105$_{x,y}$ have a relatively low risk of having a PUF value that changes over time, because their measured physical characteristic would have to change significantly over time to cause the PUF value to change (i.e., the physical characteristic has a significant margin for change between the configuration measurement and subsequent readout measurements without affecting the PUF value for that PUF cell 105$_{x,y}$). Consequently, the PUF value for each PUF cell 105$_{x,y}$ assigned to the first readout condition should be persistent, thereby improving the persistence of the PUF output.

The first readout condition threshold 860 should be set to a value where suitable configuration threshold may then be set such that there is a 50-50 chance of each PUF cell 105$_{x,y}$ having a measured physical characteristic that is either greater than or less than the threshold 860, in order to preserve the randomness of the PUF value determined for each PUF cell 105$_{x,y}$. This can be achieved using standard statistical analyses of the distribution. The first configuration threshold 840 and second configuration threshold 850 may then be set to any suitable values that achieve a substantially 50-50 chance of different PUF values, achieve a desired balance between improving the persistence of the PUF output determined during readout and having enough PUF cells 105$_{x,y}$ available for use during readout to determine the PUF output. For example, it may be set at one standard deviation, or two standard deviations, or three standard deviations, or four standard deviations, etc from the first readout condition threshold 860. It will be appreciated that the further the configuration thresholds 840 and 850 are from the first readout condition threshold 860, the more PUF cells 105$_{x,y}$ may be 'thrown away' during configuration. However, the chances of maintaining a persistent PUF output over time will be improved. Therefore, if the array of PUF cells 105$_{x,y}$ comprises a large number of PUF cells 105$_{x,y}$ compared with the desired size of PUF output (for example, if there are 400 PUF cells 105$_{x,y}$, but the desired size of PUF output is 128-bits), the configuration thresholds 840 and 850 may be set to be relatively far from the readout threshold 860, since a large number of PUF cell 'throw aways' can be accommodated.

In an alternative approach to this technique, the n PUF cells 105$_{x,y}$ that are measured to be the furthest away from the first readout condition threshold 860 may be assigned to the first readout condition, with the remainder thrown away by assigning them to the second readout condition. For example, the value n may be the number of PUF cells 105$_{x,y}$ that will be required for determining the PUF output (for example, if the PUF output is 128-bit, then n may be set to 128). As such, the best PUF cells 105$_{x,y}$ for providing long term stability may be selected for use during the read out processes in the future. In this case, there is effectively a single configuration threshold, which is the same as the first readout condition threshold 860. The configuration threshold may be set to a value based on the statistical distribution in order to achieve a substantially 50-50 chance of getting either possible PUF value for each PUF cell 105$_{x,y}$ during readout.

In a further alternative, rather than throwing away individual PUF cells 105$_{x,y}$, entire rows of PUF cells 105$_{x,y}$ may instead be thrown away based on a comparison of measured physical characteristics against the configuration threshold(s). For example, any of the processes described above may be performed for comparing the measured physical characteristics of each PUF cell $105_{x,y}$ against the configuration threshold(s). Any rows with relatively few PUF cells $105_{x,y}$ assigned to the first readout condition may be thrown away, either by setting the configuration indicators for all PUF cells $105_{x,y}$ to the second readout condition, or by setting a row configuration indicator to indicate that that entire row should not be used during readout. If row configuration indicators are used, during readout the determination unit 170 may first read the row configuration indicator for a row and only if it indicates that the row should be used would it move on to read the configuration indicators for each PUF cell in that row. This may improve speed and power efficiency of readout, by minimising the number of parallel readout operations required during readout to determine the PUF output. In a further alternative, rather than having a single configuration indicator for each PUF cell, there may instead simply be a configuration indicator for each row. In this case, during readout all PUF cells in a row that has been assigned to the first readout condition may be readout, according to the process described later. All PUF cells in a row that has been assigned to the second readout condition may be discarded, as described later. Thus, throughout this disclosure, during readout when a configuration indicator associated with a PUF cell is read, that configuration indicator may be for that specific PUF cell, or may be for the entire row in which the PUF cell is located.

1-Bit Per PUF Cell—Shift Threshold

It will be appreciated that the above 'throw away' implementation may be useful where there are a large number of PUF cells $105_{x,y}$ compared with the size of PUF output. An alternative configuration, 'shift thresholds', may be useful where that are not a large number of PUF cells $105_{x,y}$ compared with the size of PUF output.

Figure 9A:
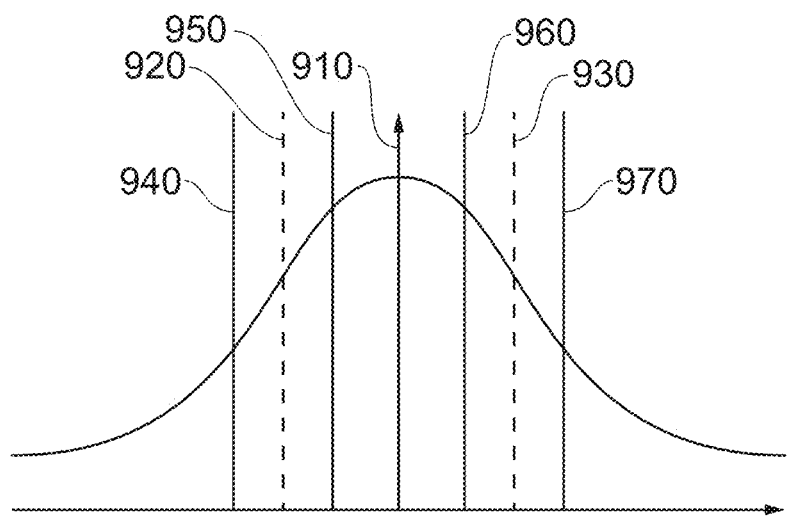
FIGS. 9A-9C show an example statistical distribution demonstrating a further configuration of the present disclosure.
Figure 9B:
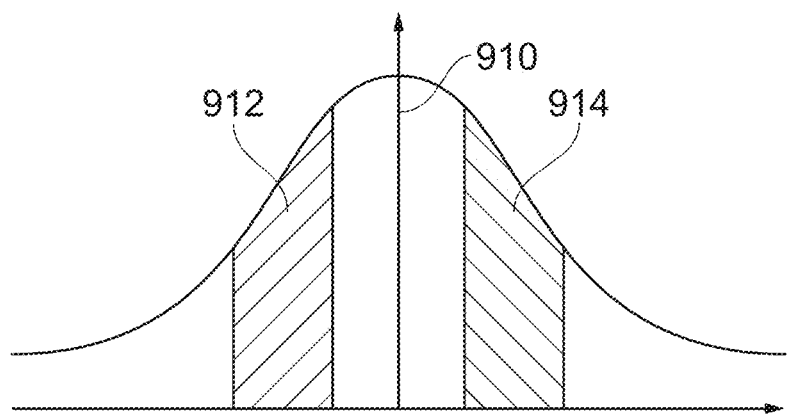
Figure 9C:
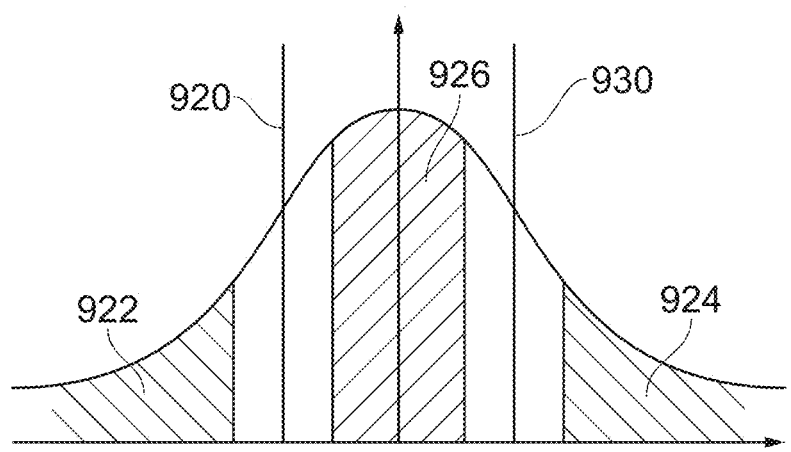

FIG. 9A shows an example statistical distribution demonstrating the configuration process for "1-bit per PUF cell—shift thresholds". FIG. 9B shows the same example statistical distribution, but demonstrates the readout process for the first readout condition of "1-bit per PUF cell—shift thresholds". FIG. 9C shows the same example statistical distribution, but demonstrates the readout process for the second readout condition of "1-bit per PUF cell—shift thresholds". The statistical distribution for the plurality of PUF cells $105_{x,y}$ may be an assumed distribution or may be determined by measuring the physical characteristic of some or all of the PUF cells $105_{x,y}$.

FIG. 9A shows a first readout condition threshold 910, which is used during readout when a PUF cell is assigned to the first readout condition. The figure also shows second readout condition thresholds 920 and 930, which are used during readout when a PUF cell is assigned to the second readout condition. The figure also shows a first configuration threshold 940, a second configuration threshold 950, a third configuration threshold 960 and a fourth configuration threshold 970.

During configuration, step S510 is carried out as described above. Step S520 is also carried out as described above with reference to one-bit per PUF cell—throw away, except the measured physical characteristic is compared against the first configuration threshold 940, the second configuration threshold 950, the third configuration threshold 960 and the fourth configuration threshold 970. The configuration thresholds define a plurality of ranges. In Step 530, if the measured physical characteristic is in the range between the first configuration threshold 940 and the second configuration threshold 950, or is in the range between the third configuration threshold 960 and the fourth configuration threshold 970, the configuration indicator for the PUF cell is set to assign the PUF cell $105_{x,y}$ to the first readout condition. If the measured physical characteristic is in the range below the first configuration threshold 940, or in the range between the second configuration threshold 950 and the third configuration threshold 960, or in the range above the fourth configuration threshold 970, the configuration indicator for the PUF cell $105_{x,y}$ is set to assign the PUF cell $105_{x,y}$ to the second readout condition.

FIG. 9B shows a representation of the first readout condition (the 'unshifted condition'). The area between the first configuration threshold 940 and second configuration threshold 950 is represented as region 912. The area between the third configuration threshold 960 and fourth configuration threshold 970 is represented as region 914. During configuration, all of the PUF cells $105_{x,y}$ that had a measured physical characteristic within either region 912 or region 914 should have been assigned to the first readout condition. As can be seen, region 912 and 914 are both separated from the first readout condition threshold 910. One side of the first readout condition threshold may have a particular PUF value (eg "0") and the other side may have a different PUF value (eg "1"). For example, region 912 may be assigned a PUF value of "0" and region 914 may be assigned a PUF value of "1". The configuration thresholds may be set to particular values that result in the area of region 912 being the same as the area of region 914, such that the probability of a PUF cell being in region 912 is approximately the same as the probability of it being in region 914.

During readout, if a PUF cell $105_{x,y}$ has been assigned to the first readout condition, a readout measurement of the physical characteristic of the PUF cell $105_{x,y}$ may be taken and compared against the first readout condition threshold 910. Therefore, the first readout condition for "1-bit per PUF cell—shift threshold" is effectively the same as the first readout condition for "1-bit per PUF cell—throw away". If, for example, region 912 has been assigned "0" and region 914 has been assigned "1", then if the readout measurement is in the range that is less than the first readout condition threshold 910, the PUF value will be determined to be "0". If the readout measurement is in the range that is greater than the first readout condition threshold 910, the PUF value will be determined to be "1". Because region 912 and 914 are separated from the first readout condition threshold 910, the readout measurements of physical characteristic may change over time compared with the measurement taken during configuration and still the PUF value for those PUF cells $105_{x,y}$ should not change over time, since the measurements of physical characteristic are unlikely to change enough over time to move from one side of threshold 910 to the other.

FIG. 9C shows a representation of the second readout condition (the "shifted" threshold condition). The area less than the first configuration threshold 940 is represented as region 922. The area between the second configuration threshold 950 and third configuration threshold 960 is represented as region 926. The area greater than the fourth configuration threshold 970 is represented as region 924. During configuration, all of the PUF cells $105_{x,y}$ that had a measured physical characteristic falling within any of region 922, region 924 or region 926 should have been assigned to the second readout condition. As can be seen, all of regions 922, 924 and 926 are separated from the second readout thresholds 920 and 930. Regions 922 and 924 may be assigned to a particular PUF value (eg "0") and region 926 may be assigned to a different PUF value (eg "1"). The configuration thresholds may be set to particular values that result in the area of region 922 and region 924 together being the same as the area of region 926, such that the cumulative probability of a PUF cell being in region 922 and 924 is approximately the same as the probability of it being in region 926.

During readout, if a PUF cell $105_{x,y}$ has been assigned to the second readout condition, a readout measurement of the physical characteristic of the PUF cell $105_{x,y}$ is taken and compared against the second readout condition thresholds 920 and 930. The second readout condition thresholds 920 and 930 define a plurality of ranges (in this example three ranges) and to generate a PUF value during readout, it is determined which range a readout measurement of the physical characteristic is in. If the measured physical characteristic is less than both of the second readout condition thresholds 920 and 930, or greater than both of the second readout condition thresholds 920 and 930, then the PUF value for that PUF cell $105_{x,y}$ is set to a first digital state (in this example "0"). If the measured physical characteristic is between the second readout condition thresholds 920 and 930, then the PUF value for that PUF cell $105_{x,y}$ is set to a second digital state (in this example "1").

Thus, it can be seen that the second readout condition has shifted readout thresholds compared with the first readout condition. Because regions 922, 924 and 926 are all separated from the second readout thresholds 920 and 930, the readout measurements of physical characteristic may change over time compared with the measurement taken during configuration and still the PUF value for those PUF cells $105_{x,y}$ should not change over time, since the measurements of physical characteristic are unlikely to change enough over time to move from one side of threshold 910 or threshold 920 to the other side.

Consequently, the PUF value for each PUF cell $105_{x,y}$ should be persistent, thereby improving the persistence of the PUF output. Furthermore, it can be seen that none of the PUF cells $105_{x,y}$ are discarded/thrown away during the configuration process, such that they may all be used during readout and therefore all contribute to the determination of the PUF output.

It will be appreciated that the readout thresholds 910, 920 and 930 and the configuration thresholds 940, 950, 960 and 970 may all be set using standard statistical techniques such that the areas of regions 912 and 914 are the same, and such that the area of region 922 plus the area of region 926 is the same as the area of region 924. In this way, randomness of the PUF value determined for each PUF cell may be preserved.

Multi-Bit Per PUF Cell

Configuration and readout for this implementation is similar to "1-bit per PUF cell—threshold shift", except a greater number of configuration thresholds and readout thresholds are used to enable each PUF cell to be used to generate a multi-bit persistent random PUF value.

Figure 10A:
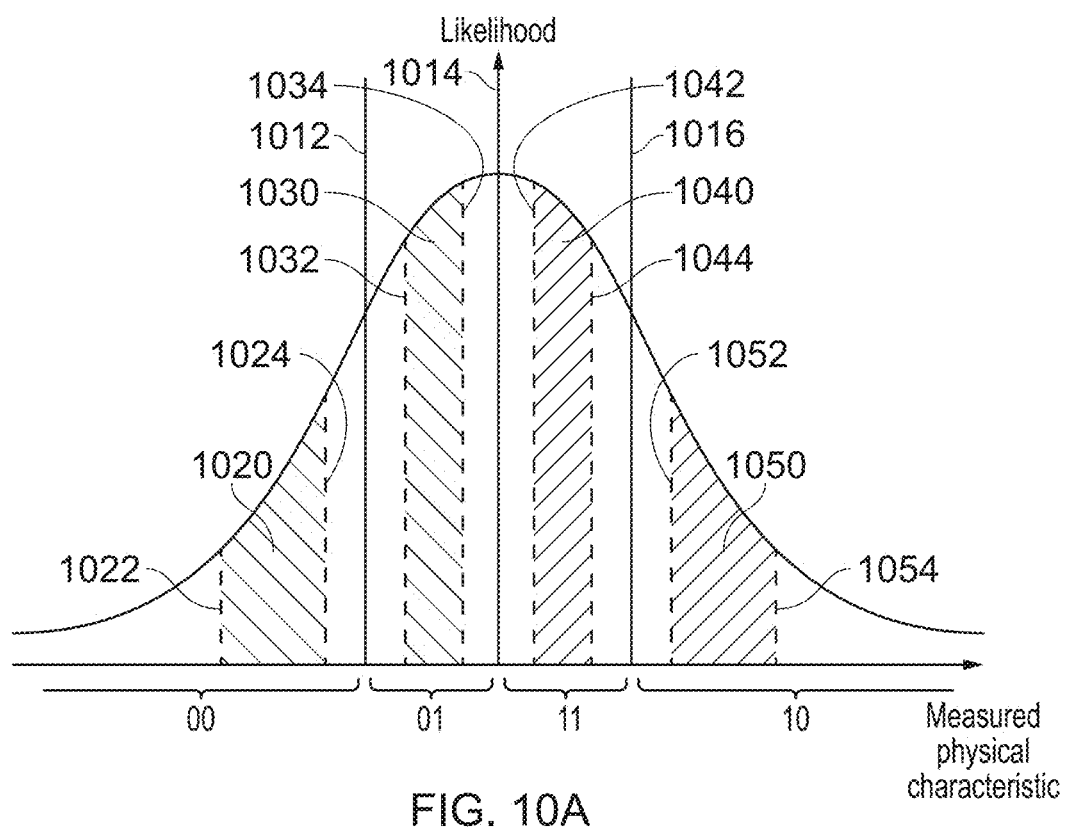
FIGS. 10A-10B show an example statistical distribution demonstrating a further configuration of the present disclosure.
Figure 10B:
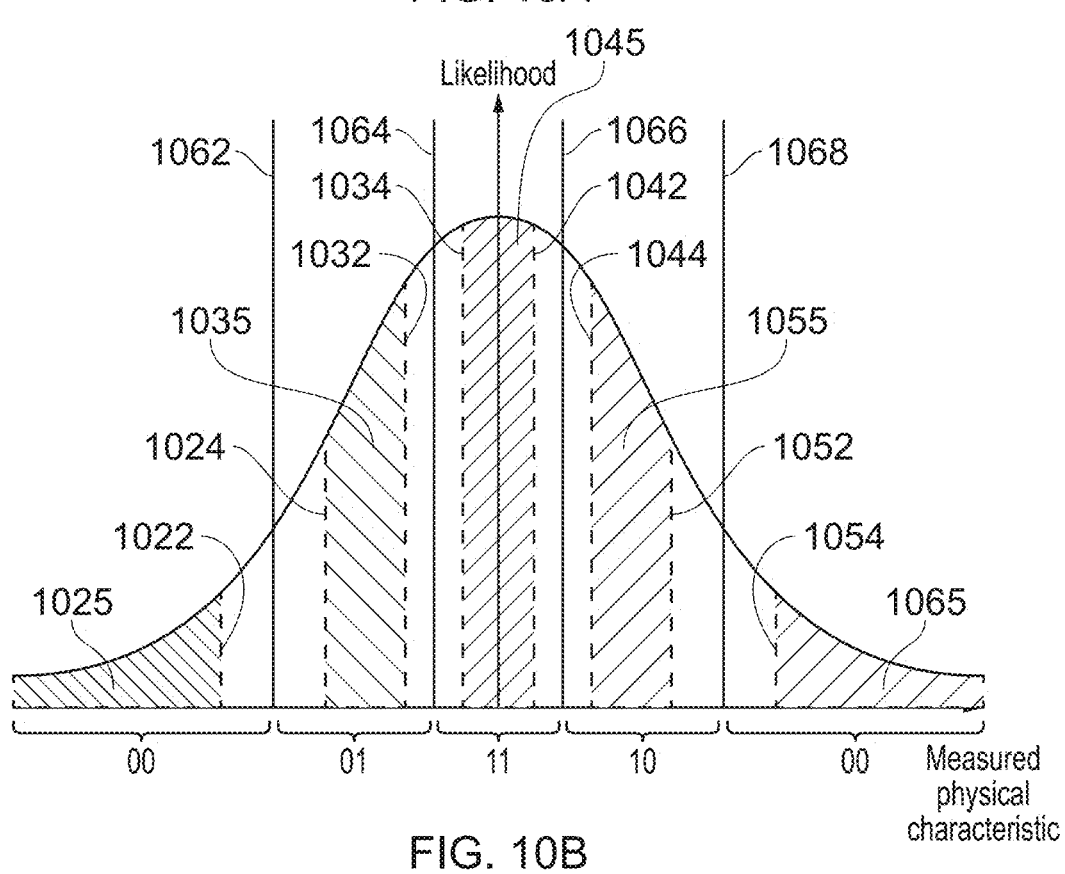

FIG. 10A shows an example statistical distribution demonstrating the first readout condition of "multi-bit per PUF cell". FIG. 10B shows the same example statistical distribution, but demonstrates the second readout condition of multi-bit per PUF cell. The statistical distribution for the plurality of PUF cells $105_{x,y}$ may be an assumed distribution or may be determined by measuring the physical characteristic of some or all of the PUF cells $105_{x,y}$.

FIG. 10A shows a representation of first readout condition thresholds 1012, 1014 and 1016. It also shows a representation of a first configuration threshold 1022, a second configuration threshold 1024, a third configuration threshold 1032, a fourth configuration threshold 1034, a fifth configuration threshold 1042, a sixth configuration threshold 1044, a seventh configuration threshold 1052 and an eighth configuration threshold 1054. Finally, the figure also shows representations of configuration regions 1020, 1030, 1040 and 1050.

FIG. 10B shows a representation of second readout condition thresholds 1062, 1064, 1066 and 1068. It also shows the eight configuration thresholds described above. Finally, the figure also shows representations of configuration regions 1025, 1035, 1045, 1055 and 1065.

During configuration of a PUF cell, in Step S520 the measured physical characteristic is compared against the configuration thresholds identified above. In Step S530, if the measured physical characteristic is between the first configuration threshold 1022 and the second configuration threshold 1024, or between the third configuration threshold 1032 and the fourth configuration threshold 1034, or between the fifth configuration threshold 1042 and the sixth configuration threshold 1044, or between the seventh configuration threshold 1052 and the eighth configuration threshold 1054 (i.e., if the measured physical characteristic is in any of the shaded regions represented in FIG. 10A), the configuration indictor for that PUF cell $105_{x,y}$ is set to assign the PUF cell $105_{x,y}$ to the first readout condition. If, however, the measured physical characteristic is less than the first configuration threshold 1022, or between the second configuration threshold 1024 and the third configuration threshold 1032, or between the fourth configuration threshold 1034 and the fifth configuration threshold 1042, or between the sixth configuration threshold 1044 and the seventh configuration threshold 1052, or greater than the eighth configuration threshold 1054 (i.e., if the measured physical characteristic is in any of the shaded regions represented in FIG. 10B) the configuration indictor for that PUF cell $105_{x,y}$ is set to assign the PUF cell $105_{x,y}$ to the second readout condition.

During readout of a PUF cell $105_{x,y}$, if it has been assigned to the first readout condition, a readout measurement of the physical characteristic may be compared against the first readout condition thresholds 1012, 1014 and 1016. The first readout condition thresholds define a first plurality of ranges. In this particular example, if the measured physical characteristic is in the range less than threshold 1012, the PUF value is 00. If the measured physical characteristic is in the range greater than threshold 1012 but less than threshold 1014, the PUF value is 01. If the measured physical characteristic is in the range greater than threshold 1014 but less than threshold 1016, the PUF value is 11. If the measured physical characteristic is in the range greater than threshold 1016, the PUF value is 11.

During readout of a PUF cell $105_{x,y}$, if it has been assigned to the second readout condition a readout measurement of the physical characteristic may be compared against the second readout condition thresholds 1062, 1064, 1066 and 1068. The second readout condition thresholds define a second plurality of ranges. In this particular example, if the measured physical characteristic is in the range less than threshold 1062 or in the range greater than threshold 1068, the PUF value is 00. If the measured physical characteristic is in the range greater than threshold 1062 but less than threshold 1064, the PUF value is 01. If the measured physical characteristic is in the range greater than threshold 1064 but less than threshold 1066, the PUF value is 11. If the measured physical characteristic is in the range greater than threshold 1066 but less than threshold 1068, the PUF value is 10.

The configuration thresholds may be set to values such that the probability for each different PUF value is approximately the same (i.e., the total shaded area for each PUF value is FIG. 10A is approximately the same, and the total shaded area for each PUF value is FIG. 10B is approximately the same), so that the PUF value for each PUF cell $105_{x,y}$ is random. Furthermore, the readout thresholds and configuration thresholds may be set such that there is a sufficient gap between them to reduce the chances of the measured physical characteristic changing over time by a sufficient amount to change the PUF value of a PUF cell $105_{x,y}$. Thus, it can be seen that a single PUF cell $105_{x,y}$ may be used to generate a 2-bit value that is persistent and random. Whilst a 2-bit PUF value has been used in this example, it will be appreciated that by using an even greater number of configuration thresholds and readout thresholds, the determination unit 170 may be configured to determine an even larger PUF value for each PUF cell $105_{x,y}$ (eg, 3-bit, or 4-bit, etc).

In this example, grey coding has been used for adjacent regions. For example, in the second readout condition, a measured physical characteristic that is less than threshold 1062 will result in a PUF value of 00 and a measured physical characteristic greater than threshold 1062 but less than threshold 1064 will result in a PUF value of 01 (i.e., only one bit value different). By changing the value of only one bit for each adjacent readout region, if a measured physical characteristic of a PUF cell $105_{x,y}$ were to drift sufficiently over time to move from one side of a readout threshold to another, the value of only one bit will change. This minimises the error caused and makes it more feasible that errors may be dealt with using ECC. However, it will be appreciated that whilst using grey coding may be useful, any other suitable coding scheme may be used.

Readout

Figure 11:
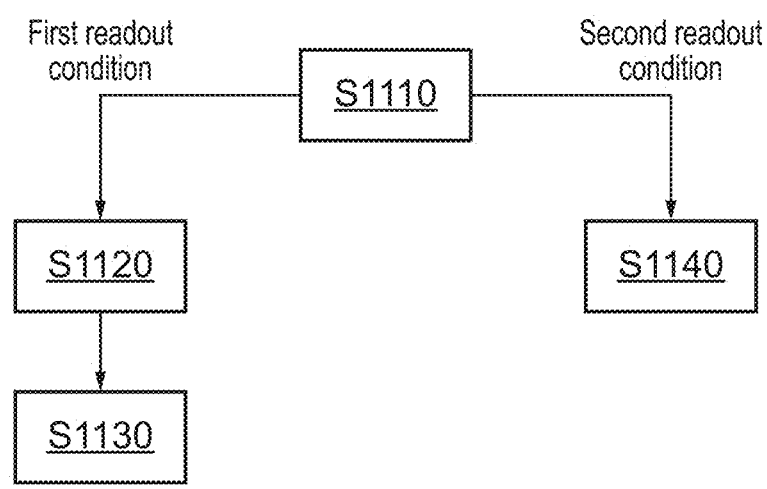
FIG. 11 shows example steps in a method of readout of a PUF cell of FIG. 1 in accordance with an aspect of the present disclosure.

FIG. 11 shows a visualisation of example steps in a method of readout of a PUF cell $105_{x,y}$ in accordance with an aspect of the present disclosure. This method may be performed for some or all of the PUF cells $105_{x,y}$ in the PUF apparatus/system 100, during lifetime usage of the PUF apparatus/system 100. The method may be performed each time a PUF output is required from the PUF apparatus/system 100.

In Step S1110, the determination unit 170 reads the configuration indicator associated with the PUF cell $105_{x,y}$ to determine if the PUF cell $105_{x,y}$ was assigned during configuration to a first readout condition or to a second readout condition. If the PUF cell $105_{x,y}$ was assigned to the first readout condition, the method proceeds to Step S1120. If the PUF cell $105_{x,y}$ was assigned to the second readout condition, the method proceeds to Step S1140.

In Step S1120, the determination unit 170 measures a physical characteristic of the PUF cell $105_{x,y}$, (eg a transistor difference value or a capacitor difference value, described earlier), wherein the measurement of the physical characteristic is indicative of a random manufacturing variation of the PUF cell. For example, the determination unit may carry out the processes described above with respect Step S510 of FIG. 5.

In Step S1130, the determination unit 170 determines a persistent random value for the PUF cell $105_{x,y}$ by comparing the physical characteristic against the at least one first readout condition threshold. For example, if the determination unit 170 has been configured according to the 1-bit per PUF cell implementations described above, the first readout condition threshold may comprise only one threshold (such as threshold 860 in FIG. 8 or threshold 910 in FIG. 9). The persistent random PUF value may be set to a first digital state (such as "0" or "1") if the measured physical characteristic is less than the threshold and set to a second digital state (such as "1" or "0") if the measured physical characteristic is greater than the threshold. If the determination unit 170 has been configured according to the multi-bit per PUF cell implementation described above, the first read-out condition threshold may comprise a plurality of thresholds (such as thresholds 1012, 1014 and 1016 in FIG. 10A) that define a first plurality of ranges (such as the range below threshold 1012, the range above threshold 1016, the range between threshold 1012 and threshold 1014, etc). Comparing the measured physical characteristic against the first readout condition thresholds may then comprise identifying which of the first plurality of ranges the physical characteristic is within and determining the static random value based on which of the first plurality of ranges the physical characteristic is within, as described earlier.

In Step S1140, a second readout condition action is performed. The second readout condition action depends on how the determination unit 170 has been configured. If the determination unit 170 has been configured according to "1-bit per PUF cell—throw away" described above, the second readout condition indicates that the PUF cell $105_{x,y}$ should not be used for generating a persistent random value. Consequently, the second readout condition action would comprise taking no further action in respect of that PUF cell, at which time the determination unit 170 may move on to reading out the next PUF cell $105_{x,y}$, if appropriate. If the determination unit 170 has been configured according to "1-bit per PUF cell—shift threshold" described above, the second readout condition action comprises comparing the physical characteristic against at least one second read-out condition threshold, which comprises threshold 920 and threshold 930 represented in FIG. 9. In this case, the persistent random value may be set to a first digital state (such as "0" or "1") if the physical characteristic is less than both of the two thresholds 920 and 930 or greater than both of the two thresholds 920 and 930. The persistent random value may be set to a second digital state (such as "1" or "0") if the physical characteristic is between the two thresholds 920 and 930. If the determination unit 170 has been configured according to "multi-bit per PUF cell" described above, the second readout condition action comprises comparing the physical characteristic against a second read-out condition threshold, which comprises a plurality of thresholds (such as threshold 1062, 1064, 1066 and 1068) that define a second plurality of ranges (such as a range below threshold 1062, a range between threshold 1064 and threshold 1066, etc) that are different to the first plurality of ranges used for the first readout condition. Comparing the physical characteristic against the second readout condition threshold comprises identifying which of the second plurality of ranges the physical characteristic falls within and determining the persistent random value based on which of the second plurality of ranges the physical characteristic falls within.

This readout process may be repeated for a plurality of the PUF cells $105_{x,y}$, optionally in serial or in parallel. For example, as explained earlier the PUF apparatus 100 may be configured such that the physical characteristic of a plurality of PUF cells (for example, some of all of the PUF cells in a particular row) may be measured in parallel and persistent random PUF values determined based on those measured physical characteristics. In this way, faster readout and persistent random PUF value determination may be achieved. Each determined PUF value may then be used by the determination unit 170 for generating the PUF output. For example, the PUF values may be concatenated in a particular order to form the persistent random PUF output, or any other suitable operations may be performed on the PUF values to generate the PUF output.

During readout, the physical characteristic of the PUF cell 105$_{x,y}$ may optionally be determined as a digital measurement. In this case, the digital measurement of the physical characteristic may have M quantisation levels and the persistent random PUF value may have a digital value of N quantisation levels, wherein M is greater than N. It will be appreciated that in this example, in order to accurately determine the persistent random PUF value for a PUF cell, the measurement of the physical characteristic should have a finer resolution (eg, a larger number of quantisation levels) than the PUF value.

Furthermore, in each of the configurations, it will be appreciated that the configuration thresholds effectively define a readout error margin for the readout condition thresholds. For example, if during configuration it is determined that the measurement of physical characteristic is within the readout error margin around the first readout condition threshold(s) defined by the configuration thresholds, the PUF cell 105$_{x,y}$ may be assigned to the second readout condition. Thus, a margin of error, or change, in readout measurements may be tolerated without a resulting change in PUF value.

By developing the above described techniques for configuration and readout, where a measurement of the magnitude of the physical characteristic of each PUF cell may be measured and then use for configuration or determining a PUF value, it is possible to configure or readout a plurality of PUF cells in parallel, for example using circuit arrangements such as those represented in FIGS. 3A, 3B and 4C (although other circuit designs may also be used), whilst still maintaining persistence and reliably of the determined PUF values, and therefore persistence and reliability of the PUF output. Consequently, a reliability persistent PUF output may be determined more quickly than might otherwise be achieved.

The skilled person will readily appreciate that various alterations or modifications may be made to the above described aspects of the disclosure without departing from the scope of the disclosure.

For example, as explained earlier, the statistical distributions represented in FIGS. 6-10B may be assumed distributions, or distributions determined through measurements of some or all of the PUF cells 105$_{x,y}$. It may be preferable to find the statistical distribution through measurement of the physical characteristics of the PUF cells 105$_{x,y}$, based on which the configuration and readout thresholds may then be set. In this way, the readout threshold(s) may be set on a per device basis, thereby improving the randomness of the determined PUF values. In some examples, the PUF apparatus 100 may comprise many more PUF cells 105$_{x,y}$ than will be needed to generate the PUF output. In this case, some or all of the PUF cells 105$_{x,y}$ may still be measured to determine a very accurate statistical distribution and only a selection (possibly selected at random during configuration) of the PUF cells 105$_{x,y}$ may be configured during use during readout.

Typically, during readout of a PUF cell, its physical characteristic is measured (for example, magnitude and sign) and then compared against one or more readout thresholds. However, in the example of "1-bit per PUF cell—throw away", Step S1120 in FIG. 11 may be omitted and the persistent random PUF value determined using a straightforward comparison of the physical characteristic against the single readout threshold (for example, using a straightforward comparator or quantizer configured to indicate merely which side of the threshold the physical characteristic falls). Consequently, 'measuring' the physical characteristic may be optional in the process of determining the persistent random PUF value.

Pairs of configuration thresholds may be set each side of a read out threshold, equal distances from the read out threshold, for example if the statistical distribution of measured physical characteristics is symmetrical. However, they may alternatively be set unequal distances from the read out threshold, for example if the distribution is asymmetric.

In the above, there may be two possible readout conditions for each PUF cell. However, there may be three or more possible readout conditions for each PUF cell. For example, the first readout condition may be to compare a measure of the physical characteristic against a first readout condition threshold(s) and the second readout condition may be to compare the measure of the physical characteristic against a second readout condition threshold(s) (as per the shift threshold and multi-bit implementations described above). The third readout condition may be not to use the PUF cell for the determination of the PUF output (equivalent to the second readout condition of the 'throw away' implementation described above). In this case, the configuration indicator may, for example, comprise two bits. The first bit may indicated whether or not the PUF cell is assigned to the third readout condition. If it is, it should not be used as part of the PUF output determination. If it is not assigned to the third readout condition, the second bit may be read to determine if the PUF cell has been assigned to the first or second readout condition, which informs which readout condition threshold(s) to use. In a further optional alternative of the readout process, there may not be a configuration indicator set for any of the PUF cells. In this alternative, readout step S1110 may be omitted and a measurement of the physical characteristic of one or more pairs of devices may be made using any of the measurement processes described above. The one or more measures of physical characteristic may then be used to determine at least part of a PUF output (for example, by comparing each measured physical characteristic against a predetermined readout threshold(s)). In one particular example where there are a plurality of PUF cells arranged in an array, a measurement of the physical characteristic of two or more PUF cells may be readout in parallel at the same time, with the two or more measurements then being used to determine at least part of the PUF output.

For some PUF systems 100, the same determination unit 170 may be used for both PUF configuration and PUF readout. In some alternative implementations, one determination unit may configured for performing PUF configuration and a different determination unit may be configured for performing PUF readout.

The invention claimed is:

1. A Physical Unclonable Function (PUF) apparatus for determining a PUF output that is a persistent number, the PUF apparatus comprising:
   a plurality of PUF cells, each comprising a plurality of electronic devices; and
   a PUF output circuit configured to:
     determine a measurement of a magnitude of a physical characteristic of each of at least first and second PUF cells of the plurality of PUF cells such that at least two measurements of the magnitude are determined; and determine the PUF output based at least in part on the at least two measurements of the magnitude of the physical characteristic, wherein determining the PUF output comprises comparing each measurement of the at least two measurements against a plurality of comparison threshold magnitudes defining a plurality of ranges.

2. The PUF apparatus of claim 1, wherein the plurality of electronic devices comprise at least one of: active devices or passive devices, or wherein the plurality of electronic devices comprise a pair of single component devices.

3. The PUF apparatus of claim 1, wherein the measurement of the magnitude of the physical characteristic of the first PUF cell and the measurement of the magnitude of the physical characteristic of the second PUF cell are determined in parallel.

4. The PUF apparatus of claim 1, wherein the plurality of electronic devices form a pair of composite devices, each composite device comprising a plurality of components.

5. The PUF apparatus of claim 4, wherein the pair of composite devices are a pair of ring oscillators or a pair of NOT gate strings.

6. The PUF apparatus of claim 1, wherein each of the plurality of PUF cells has an associated configuration indicator, wherein the configuration indicator for each of the first and second PUF cells is set to indicate whether the PUF cell associated with the configuration indicator is assigned to be used in determining the PUF output or is to be thrown away.

7. A method for determining a physical unclonable function (PUF) output that is a persistent number, the method comprising:
    determining a plurality of measurements of a magnitude of a physical characteristic of each of at least first and second PUF cells of plurality of PUF cells such that at least two measurements are performed, wherein each PUF cell comprises a plurality of electronic devices; and
    determining the PUF output based at least in part on the at least two measurements of the magnitude of the physical characteristic, wherein determining the PUF output comprises comparing each measurement of the at least two measurements against a plurality of comparison threshold magnitudes defining a plurality of ranges.

8. The method of claim 7, wherein the plurality of electronic devices comprise at least one of: active devices or passive devices, or wherein the plurality of electronic devices comprise a pair of single component devices.

9. The method of claim 7, wherein the measurement of the magnitude of the physical characteristic of the first PUF cell and the measurement of the magnitude of the physical characteristic of the second PUF cell are determined in parallel.

10. The method of claim 7, wherein the plurality of electronic devices form a pair of composite devices, each composite device comprising a plurality of components.

11. The method of claim 10, wherein the pair of composite devices are a pair of ring oscillators or a pair of NOT gate strings.

12. A physical unclonable function (PUF) apparatus comprising:
    a plurality of PUF cells, each comprising a plurality of electronic devices; and
    a determination circuit configured to:
    measure a magnitude of a physical characteristic of the plurality of electronic devices of a first PUF cell of the plurality of PUF cells;
    compare the measured magnitude of the physical characteristic of the first PUF cell against a plurality of configuration threshold magnitudes defining a plurality of ranges; and
    set a first configuration indicator associated with the first PUF cell based on the comparison, wherein the first configuration indicator is indicative of how the first PUF cell should be used when generating a persistent number using the plurality of PUF cells, wherein the persistent number comprises a value with a contribution from each PUF cell.

13. The PUF apparatus of claim 12, wherein the determination circuit is further configured to:
    in parallel with measuring the magnitude of the physical characteristic of the first PUF cell, measure a magnitude of a physical characteristic of the plurality of electronic devices of a second PUF cell of the plurality of PUF cells;
    compare the second measured magnitude of the physical characteristic of the second PUF cell against the plurality of configuration threshold magnitudes; and
    set a second configuration indicator associated with the second PUF cell based on the comparison of the second measured magnitude of the physical characteristic of the second PUF cell against the plurality of configuration threshold magnitudes, wherein the second configuration indicator is indicative of how the second PUF cell should be used when generating the persistent number using the plurality of PUF cells.

14. The PUF apparatus of claim 12, wherein the determination circuit comprises an analog to digital converter for measuring the magnitude of the physical characteristic of the first PUF cell.

15. The PUF apparatus of claim 12, wherein the plurality of electronic devices comprise a pair of single component devices.

16. The PUF apparatus of claim 12, wherein the plurality of electronic devices form a pair of composite devices, each composite device comprising a plurality of components.

17. The PUF apparatus of claim 16, wherein the pair of composite devices are a pair of ring oscillators or a pair of NOT gate strings.

* * * * *